US009948807B2

(12) United States Patent
Miyazawa et al.

(10) Patent No.: US 9,948,807 B2
(45) Date of Patent: Apr. 17, 2018

(54) MULTI-FUNCTION DEVICE FOR EXECUTING PLURALITY OF FUNCTIONS RELATED TO PLURAL TYPES OF SERVICES

(71) Applicant: Brother Kogyo Kabushiki Kaisha, Nagoya-shi, Aichi-ken (JP)

(72) Inventors: Masafumi Miyazawa, Nagoya (JP); Ken Saito, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/950,019

(22) Filed: Nov. 24, 2015

(65) Prior Publication Data

US 2016/0080601 A1    Mar. 17, 2016

Related U.S. Application Data

(63) Continuation of application No. 13/705,572, filed on Dec. 5, 2012, now Pat. No. 9,232,083.

(30) Foreign Application Priority Data

Dec. 5, 2011   (JP) .................. 2011-265655

(51) Int. Cl.
  *H04N 1/00*  (2006.01)
  *G06F 3/12*  (2006.01)
  *H04N 1/44*  (2006.01)

(52) U.S. Cl.
  CPC ....... *H04N 1/00925* (2013.01); *G06F 3/1239* (2013.01); *H04N 1/0048* (2013.01);
(Continued)

(58) Field of Classification Search
  CPC ............. H04N 1/00095; H04N 1/4406; H04N 1/4433; G06F 3/1239
  See application file for complete search history.

(56) References Cited

U.S. PATENT DOCUMENTS 6,280,105 B1 * 8/2001 Iida .................. G06K 15/00
                                                    400/61
7,286,256 B2  10/2007 Herbert
(Continued)

FOREIGN PATENT DOCUMENTS

CN    101159797 A    4/2008
CN    102238302 A    11/2011
(Continued)

OTHER PUBLICATIONS

U.S. Appl. No. 15/260,382, filed Sep. 9, 2016 (specification and drawings are attached).
(Continued)

*Primary Examiner* — Nicholas Pachol
(74) *Attorney, Agent, or Firm* — Banner & Witcoff, Ltd.

(57) ABSTRACT

A multi-function device may acquire specific use information corresponding to a specific user who uses the multi-function device, request a service providing server to provide a specific service in a case where the specific service among plural types of services is selected by the specific user, and acquire screen information from a screen providing server so as to display a screen according to the screen information. The multi-function device may display a first screen for receiving the specific service from the service providing server in a case where the specific use information indicates that the specific user is allowed to use a specific function related to the specific service, and display a second screen indicating that it is not capable of receiving the specific service in a case where the specific use information indicates that the specific user is not allowed to use the specific function.

7 Claims, 10 Drawing Sheets

(52) U.S. Cl.
CPC ....... *H04N 1/0097* (2013.01); *H04N 1/00244* (2013.01); *H04N 1/00413* (2013.01); *H04N 1/00427* (2013.01); *H04N 1/00474* (2013.01); *H04N 1/00503* (2013.01); *H04N 1/00514* (2013.01); *H04N 1/00854* (2013.01); *H04N 1/00973* (2013.01); *H04N 1/4426* (2013.01); *H04N 1/4433* (2013.01); *H04N 2201/0094* (2013.01)

(56) References Cited

U.S. PATENT DOCUMENTS

| | | |
|---|---|---|
| 7,831,691 B2 | 11/2010 | Aoki et al. |
| 8,127,362 B2 | 2/2012 | Asahara |
| 8,638,461 B2 | 1/2014 | Kwon |
| 9,232,083 B2 | 1/2016 | Miyazawa et al. |
| 2002/0015598 A1 | 2/2002 | Maeda et al. |
| 2002/0136563 A1 | 9/2002 | Maeda et al. |
| 2003/0156479 A1 | 8/2003 | Fujiyoshi |
| 2004/0160630 A1* | 8/2004 | Iriyama .............. H04N 1/00204 358/1.15 |
| 2005/0094787 A1* | 5/2005 | Atobe ................ H04N 1/00204 379/111 |
| 2005/0223324 A1* | 10/2005 | Tashiro .............. G03G 15/5016 715/273 |
| 2006/0103875 A1 | 5/2006 | Aoki et al. |
| 2006/0126110 A1* | 6/2006 | Ohara ................ H04N 1/00209 358/1.15 |
| 2006/0143286 A1 | 6/2006 | Aoki et al. |
| 2007/0070460 A1* | 3/2007 | Yamada .............. H04N 1/4078 358/504 |
| 2007/0076241 A1* | 4/2007 | Okamoto ........... H04N 1/00244 358/1.14 |
| 2007/0136293 A1 | 6/2007 | Mizumukai |
| 2007/0171470 A1 | 7/2007 | Fujii et al. |
| 2007/0255428 A1* | 11/2007 | Nagata .............. G03G 15/5075 700/8 |
| 2008/0086778 A1 | 4/2008 | Asahara |
| 2008/0115059 A1 | 5/2008 | Sakai |
| 2010/0073714 A1 | 3/2010 | Mochizuki |
| 2010/0115268 A1 | 5/2010 | Kudo |
| 2010/0149592 A1 | 6/2010 | Yoshida |
| 2010/0238481 A1* | 9/2010 | Homma ................ G06F 21/629 358/1.14 |
| 2010/0325203 A1 | 12/2010 | Park et al. |
| 2011/0002003 A1* | 1/2011 | Suwabe ................ G06F 21/629 358/1.14 |
| 2011/0007351 A1 | 1/2011 | Kurumasa et al. |
| 2011/0126270 A1* | 5/2011 | Sato ........................ G06F 21/31 726/4 |
| 2011/0128574 A1 | 6/2011 | Kouno |
| 2011/0188063 A1 | 8/2011 | Nuggehalli et al. |
| 2011/0222102 A1 | 9/2011 | Ito |
| 2011/0222116 A1 | 9/2011 | Tomita |
| 2011/0228311 A1 | 9/2011 | Oguma et al. |
| 2011/0261380 A1 | 10/2011 | Kwon |
| 2012/0092728 A1 | 4/2012 | Aoki et al. |
| 2012/0314245 A1* | 12/2012 | Nakashima ........ H04N 1/00244 358/1.15 |
| 2013/0141743 A1 | 6/2013 | Miyazawa et al. |
| 2014/0331164 A1 | 11/2014 | Enomoto et al. |
| 2016/0080601 A1 | 3/2016 | Miyazawa et al. |

FOREIGN PATENT DOCUMENTS

| | | |
|---|---|---|
| JP | 2002-354170 A | 12/2002 |
| JP | 2004-157839 A | 6/2004 |
| JP | 2005-269250 A | 9/2005 |
| JP | 2006-135693 A | 5/2006 |
| JP | 2006-157861 A | 6/2006 |
| JP | 2007-193415 A | 8/2007 |
| JP | 2013-118558 A | 6/2013 |
| JP | 2014-219734 A | 11/2014 |

OTHER PUBLICATIONS

Dec. 4, 2014—U.S. Non-Final Office Action—U.S. Appl. No. 13/705,752.
Oct. 10, 2014—(CN) Notification of First Office Action—App 201210517878.3—Eng Tran.
Jun. 30, 2015—U.S. Final Office Action—U.S. Appl. No. 13/705,572.
Aug. 28, 2015—U.S. Notice of Allowance—U.S. Appl. No. 13/705,572.
Nov. 7, 2017—(EP) Extended Search Report—App 12195304.6.
Sep. 8, 2017—U.S. Non-Final Office Action—U.S. Appl. No. 15/260,382.

* cited by examiner

Use Information Table 36

| User Name | Password | Copy | FAX | Print | Scan | Remaining Pages |
|---|---|---|---|---|---|---|
| U1 | abc | Lock | Unlock | Unlock | Unlock | 0 |
| U2 | def | Unlock | Unlock | Lock | Unlock | 10 |

Display Name Table 38

| Display Name | Server Name | Access Token |
|---|---|---|
| Alice | Server A | XXXXXXX |
| Ken | Server A | YYYYYYY |
| Alice | Server B | ZZZZZZZ |

Server Table 68

| Server Name | Available Services |
|---|---|
| Server A | DL/UL |
| Server B | DL only |
| Server C | UL only |

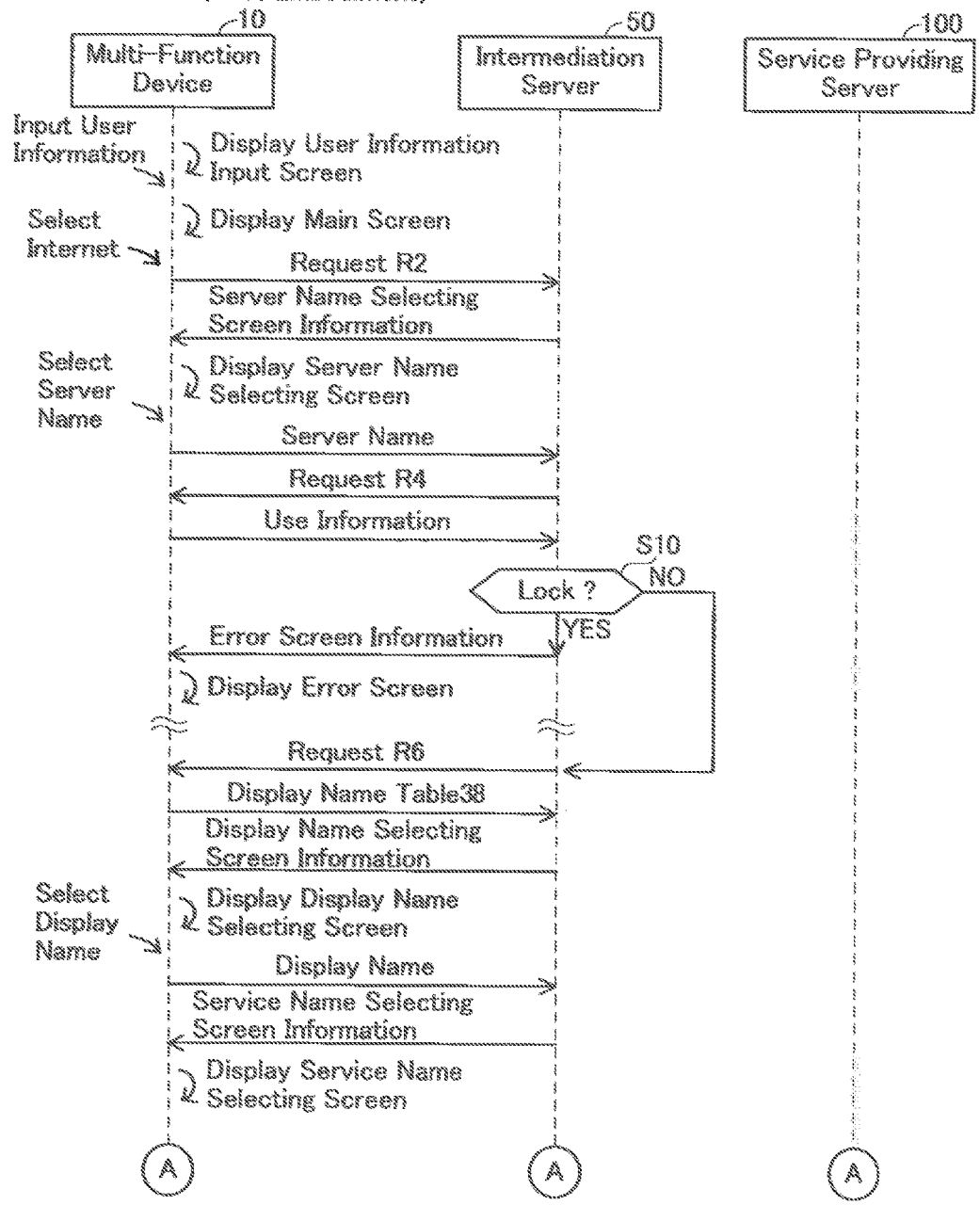
FIG. 5 (First Embodiment)

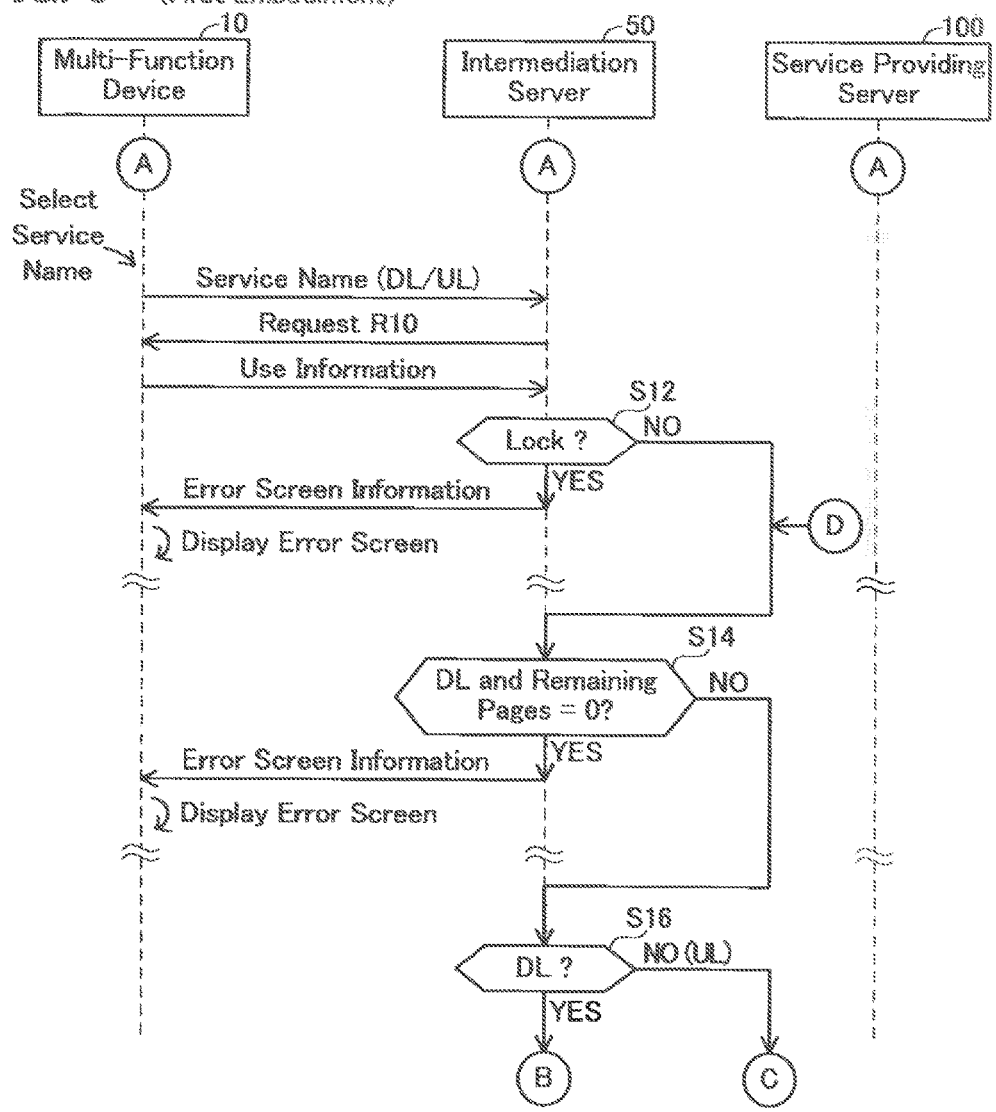

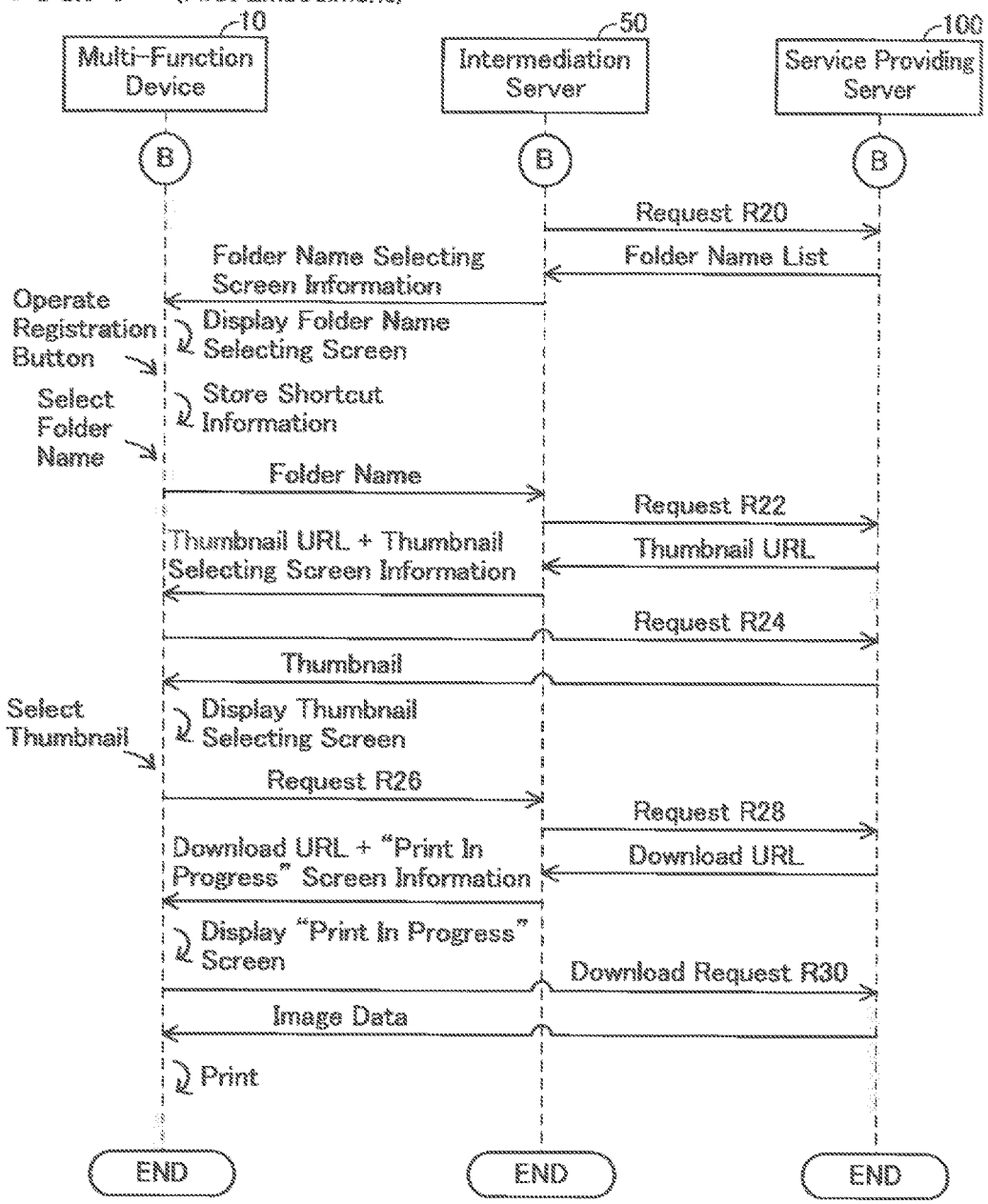

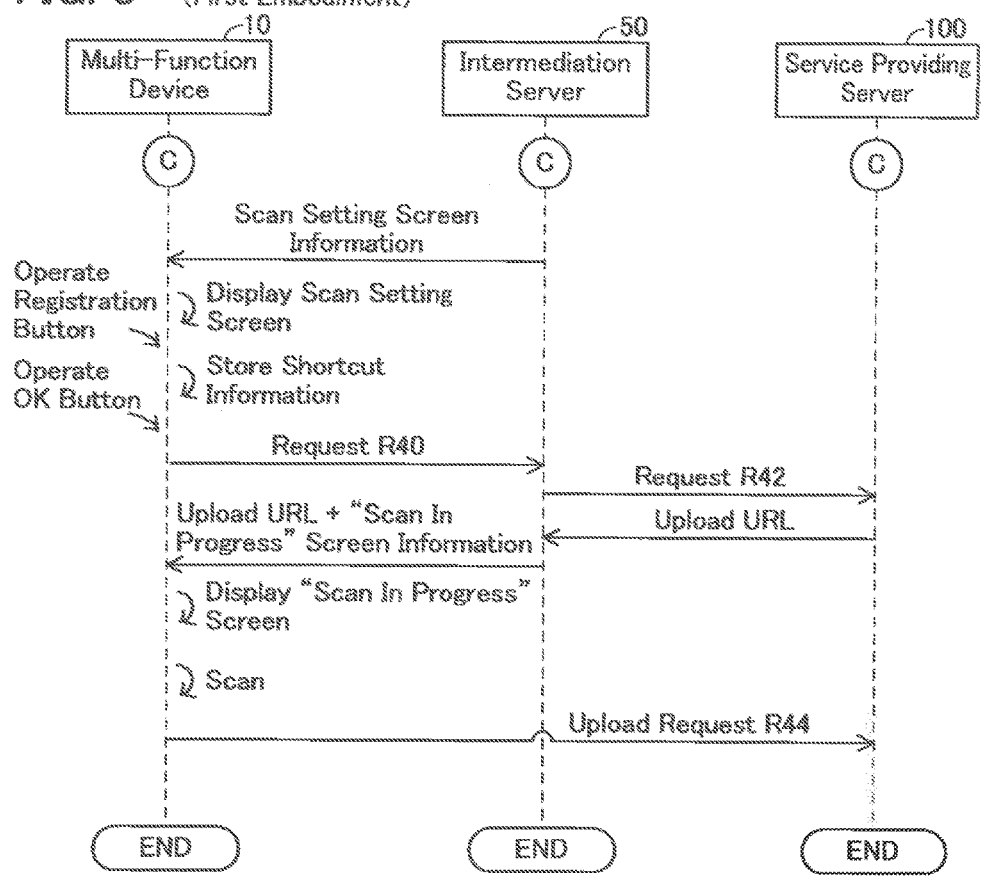

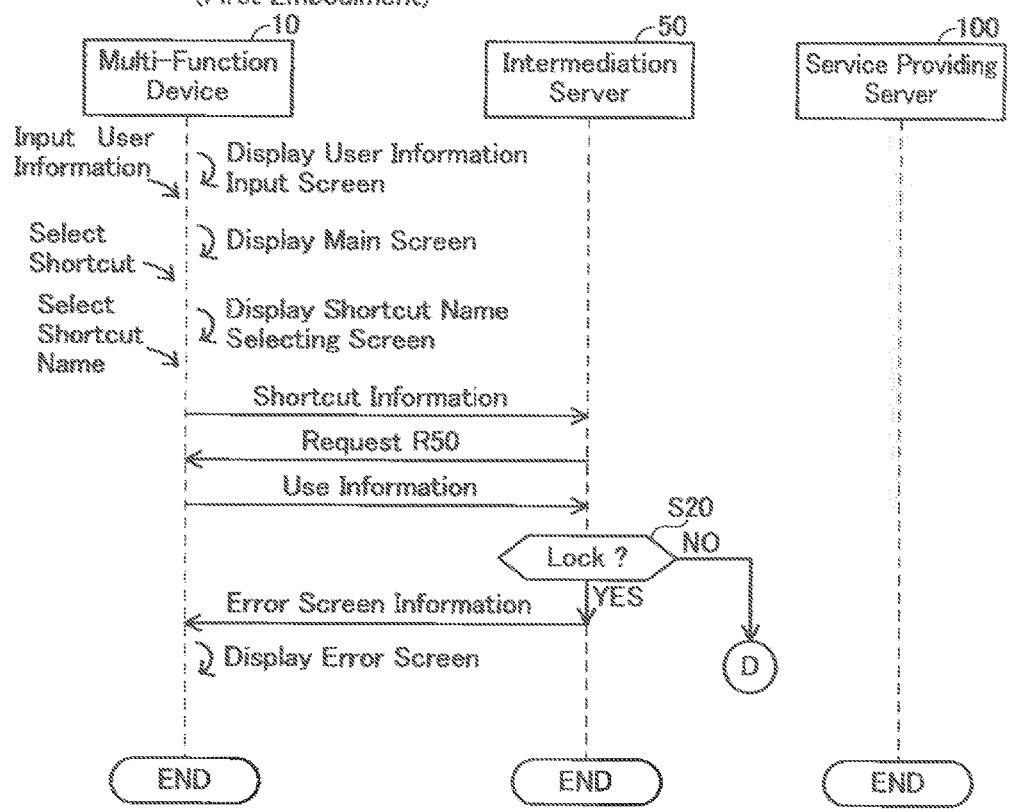

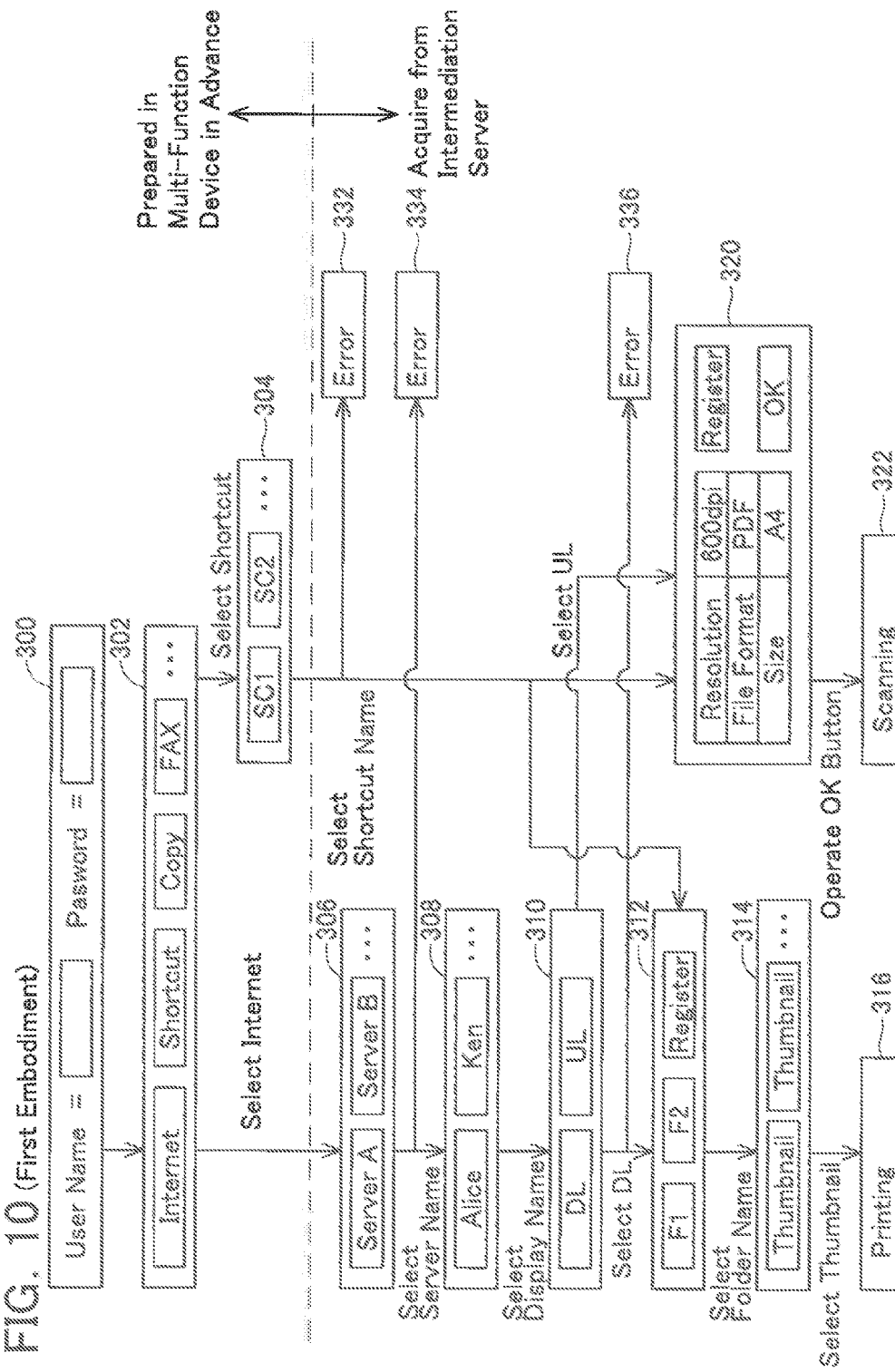
FIG. 10 (First Embodiment)

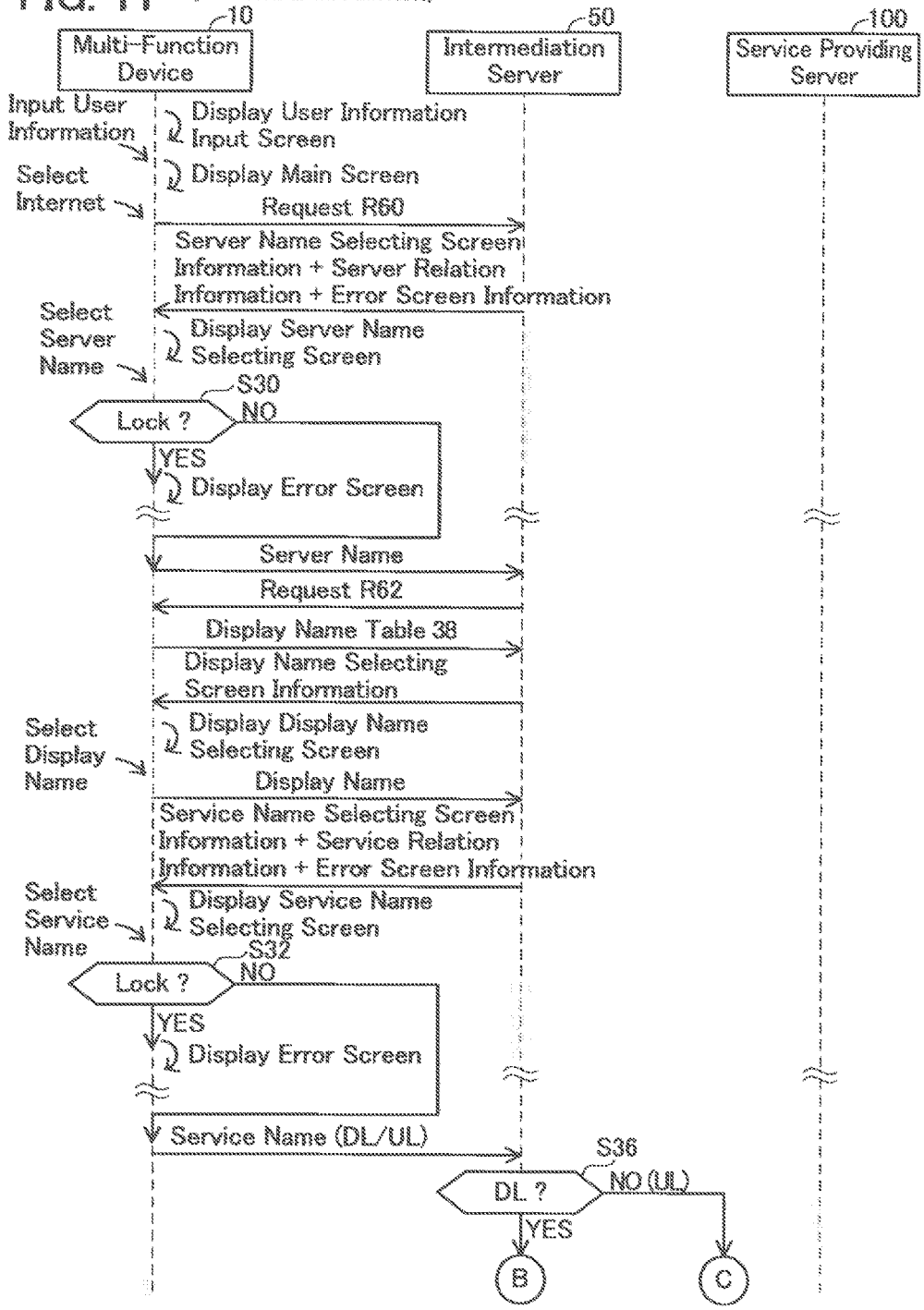

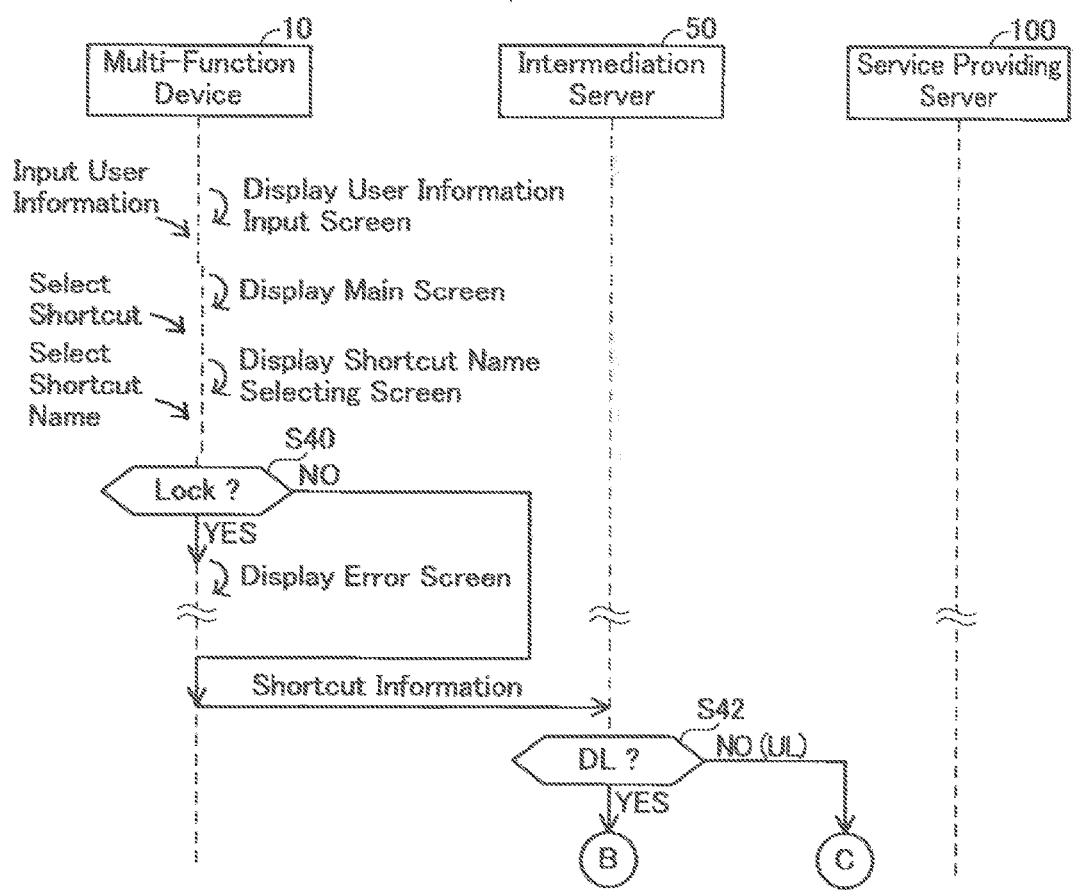
FIG. 12 (Second Embodiment)

MULTI-FUNCTION DEVICE FOR EXECUTING PLURALITY OF FUNCTIONS RELATED TO PLURAL TYPES OF SERVICES

CROSS-REFERENCE TO RELATED APPLICATIONS

This application is a continuation of and claims priority to U.S. patent application Ser. No. 13/705,572, filed on Dec. 5, 2012, which claims priority to Japanese Patent Application No. 2011-265655, filed on Dec. 5, 2011. The contents of the aforementioned applications are hereby incorporated by reference into the present application.

TECHNICAL FIELD

In the present specification, a multi-function device is disclosed which is capable of executing a plurality of functions relating to plural types of services that a service providing server is capable of providing. In the present specification, further, a screen providing server is disclosed that is connected in a communicable manner with the multi-function device.

DESCRIPTION OF RELATED ART

For example, an image processing device for scanning a document and creating image data is known. The image processing device can upload the image data to a server.

SUMMARY

The present specification may disclose a technique which, when a user of the multi-function device wishes to receive a service from a service providing server, allows the multi-function device to display an appropriate screen in accordance with the user.

One aspect disclosed in the present specification may be a multi-function device configured to execute a plurality of functions related to plural types of services that a service providing server is capable of providing. The multi-function device may comprise: a processor; and a memory configured to store computer-readable instructions therein, the computer-readable instructions, when executed by the processor, causing the multi-function device to operate as: a device-side acquiring unit configured to acquire, from a storage unit storing a plurality of use information corresponding to a plurality of users, specific use information corresponding to a specific user who uses the multi-function device, each of the plurality of use information including information related to whether or not a user corresponding to the use information is allowed to use each function that the multi-function device is capable of executing; a requesting unit configured to request the service providing server to provide a specific service in a case where the specific service among the plural types of services is selected by the specific user; and a display controlling unit configured to acquire screen information from a screen providing server so as to display a screen according to the screen information on a display unit of the multi-function device, the screen information being information for receiving the specific service from the service providing server. The display controlling unit may be configured to: display a first screen for receiving the specific service from the service providing server in a first case where the specific use information indicates that the specific user is allowed to use a specific function related to the specific service; and display a second screen indicating that it is not capable of receiving the specific service from the service providing server in a second case where the specific use information indicates that the specific user is not allowed to use the specific function.

Another aspect disclosed in the present specification may be a screen providing server configured to be connected with a multi-function device in a communicable manner. The multi-function device may be configured to execute a plurality of functions related to plural types of services that a service providing server is capable of providing. The screen providing server may comprise: a processor; and a memory configured to store computer-readable instructions therein, the computer-readable instructions, when executed by the processor, causing the screen providing server to operate as: a server-side acquiring unit configured to acquire, from a storage unit storing a plurality of use information corresponding to a plurality of users, specific use information corresponding to a specific user who uses the multi-function device, each of the plurality of use information including information related to whether or not a user corresponding to the use information is allowed to use each function that the multi-function device is capable of executing; a service information acquiring unit configured to acquire service information indicating a specific service from the multi-function device in a case where the specific service among the plural types of services is selected by the specific user; a server-side determining unit configured to determine, by using the specific use information and the service information, whether or not the specific user is allowed to use a specific function related to the specific service; and a screen information supplying unit configured to: supply first screen information representing a first screen to the multi-function device in a case where a determination is made that the specific user is allowed to use the specific function, the first screen being a screen for the multi-function device to receive the specific service from the service providing server; and not supply the first screen information to the multi-function device in a case where a determination is made that the specific user is not allowed to use the specific function.

Moreover, a control method, computer-readable instructions, and a non-transitory computer-readable recording medium that stores the computer-readable instructions, all for realizing the multi-function device, are also novel and useful. In addition, a control method, computer-readable instructions, and a non-transitory computer-readable recording medium that stores the computer-readable instructions, all for realizing the screen providing server, are also novel and useful.

BRIEF DESCRIPTION OF THE DRAWINGS

FIG. 5 shows a sequence diagram of processes executed by devices in a first embodiment.
FIG. 6 shows a sequence diagram of a continuation of FIG. 5.
FIG. 7 shows a sequence diagram of processes executed by devices when download print is executed.
FIG. 8 shows a sequence diagram of processes executed by devices when scan upload is executed.

FIG. 9 shows a sequence diagram of processes executed by devices when shortcut information is selected in the first embodiment.

FIG. 10 shows transition of screens displayed in a multi-function device.

FIG. 11 shows a sequence diagram of processes executed by devices in a second embodiment.

FIG. 12 shows a sequence diagram of processes executed by devices when shortcut information is selected in the second embodiment.

EMBODIMENT

First Embodiment (Configuration of System)

Figure 1:
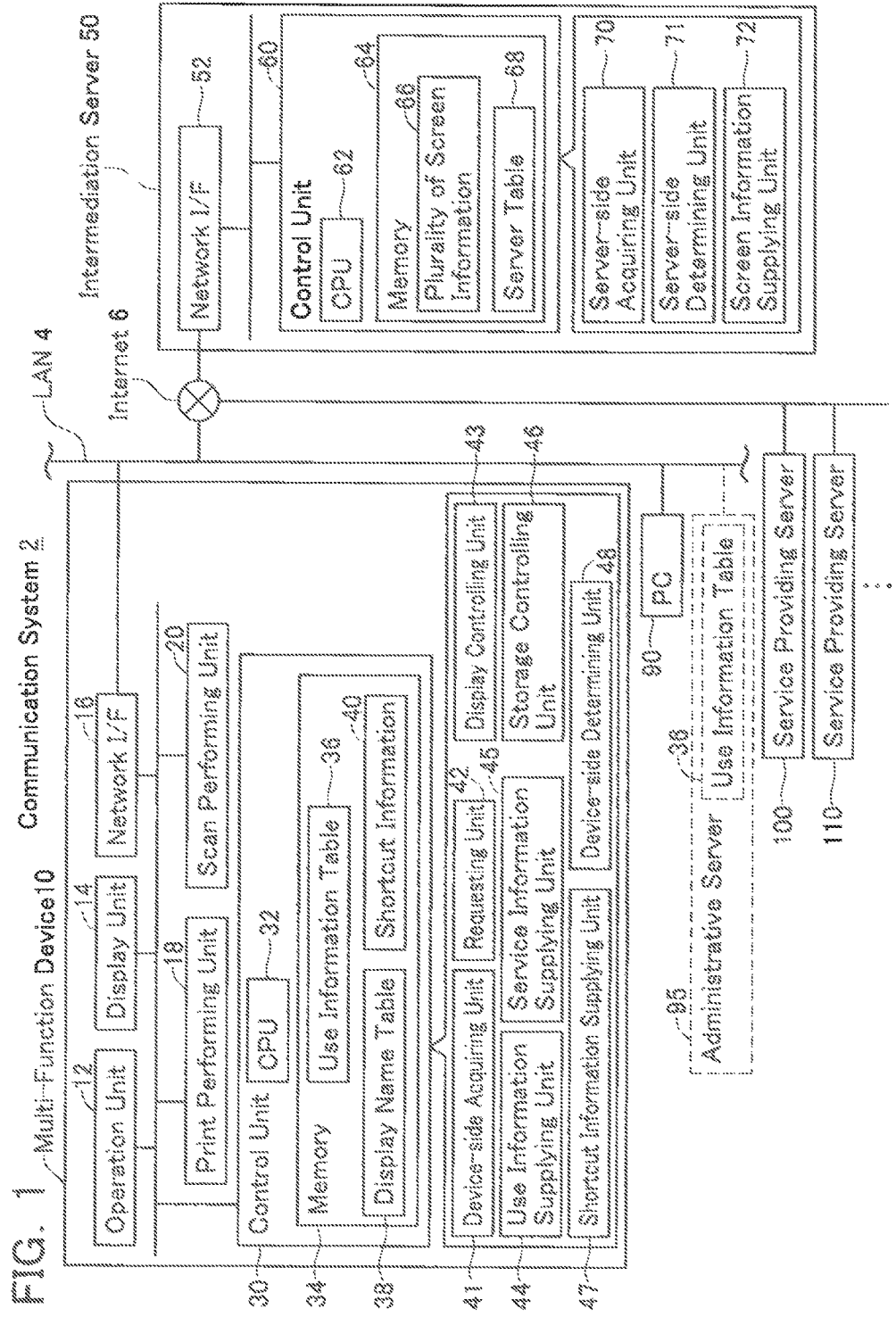
FIG. 1 shows a configuration of a communication system.

As shown in FIG. 1, a communication system 2 comprises a multi-function device 10, an intermediation server 50, a PC 90, and a plurality of service providing servers 100, 110. The multi-function device 10 and the PC 90 are connected with a LAN 4. The intermediation server 50 and the plurality of service providing servers 100, 110 are connected with an Internet 6.

(Configuration of Multi-Function Device 10)

The multi-function device 10 is capable of executing multiple functions such as a print function, scan function, copy function, FAX function, etc. The multi-function device 10 comprises an operation unit 12, a display unit 14, a network interface 16, a print performing unit 18, a scan performing unit 20 and a control unit 30. The operation unit 12 comprises a plurality of keys. A user can input various instructions to the multi-function device 10 by operating the operation unit 12. The display unit 14 is a display for displaying various types of information. The network interface 16 is connected with the LAN 4. The print performing unit 18 comprises an inkjet type or laser type, etc. printing mechanism. The scan performing unit 20 comprises a scanning mechanism such as CCD or CIS.

The control unit 30 comprises a CPU 32 and a memory 34. The CPU 32 executes various processes according to programs stored in the memory 34. The functions of units 41 to 48 are realized by the CPU 32 executing processes according to the programs.

In addition to the aforementioned programs, the memory 34 stores a use information table 36, a display name table 38 and shortcut information 40. When an administrator of the LAN 4 operates the operation unit 12 to input predetermined information, the use information table 36 is created (i.e., stored) within the memory 34. The manner of creating the display name table 38 will be described later. When the user of the multi-function device 10 operates a register button (to be described: see screens 312, 320 of FIG. 10), the shortcut information 40 is stored within the memory 34.

Figure 2:
FIG. 2 shows an example of a use information table.

As shown in FIG. 2, the use information table 36 includes a plurality of use information for a plurality of users. The use information is information in which the following are associated: user name, password, information indicating whether the user is allowed to use the copy function, information indicating whether the user is allowed to use the FAX function, information indicating whether the user is allowed to use the scan function, and number of print media available to the user before printing (remaining pages). Moreover, "Unlock" indicates that the user is allowed to use a function (i.e., indicates that the use of the function is permitted to the user), and "Lock" indicates that the user is not allowed to use a function (i.e., indicates that the use of the function is not permitted to the user).

Figure 3:
FIG. 3 shows an example of a display name table.

As shown in FIG. 3, the display name table 38 is a table for storing information in which display name, server name and access token are associated. Moreover, the contents of the shortcut information 40 will be described later.

(Configuration of Intermediation Server 50)

The intermediation server 50 is a server for intermediating the provision of service from the service providing servers 100, 110 to the multi-function device 10. The intermediation server 50 is a server provided by the vendor or manufacturer of the multi-function device 10. The intermediation server 50 comprises a network interface 52 and a control unit 60. The control unit 60 comprises a CPU 62 and a memory 64. The CPU 62 executes various processes according to programs stored in the memory 64. The functions of units 70 to 72 are realized by the CPU 62 executing processes according to the programs.

Moreover, in addition to the aforementioned programs, the memory 64 stores a plurality of screen information 66 and a server table 68. The plurality of screen information 66 and the server table 68 are stored in advance in the intermediation server 50 by the vendor or manufacturer of the multi-function device 10. The plurality of screen information 66 includes screen information representing screens (screens 306 to 316, 320 to 322, 332 to 336 of FIG. 10; to be described) relating to the print function and the scan function that the multi-function device 10 is capable of executing.

Figure 4:
FIG. 4 shows an example of a server table.

As shown in FIG. 4, the server table 68 is a table for storing information in which a server name and available services are associated. In the present embodiment, "Server A", "Server B" are the respective server names of the service providing servers 100, 110. The "DL" of the available services indicates that the service providing server can provide a service (called "data download service (DL service)" below) for supplying data to a communication device (e.g., the multi-function device 10). The "UL" of the available services indicates that the service providing server can provide a service (called "data upload service (UL service)" below) for acquiring data from the communication device and storing the data. In the example of FIG. 4, the service providing server 100 that has the server name "Server A" is capable of providing both the DL service and the UL service, and the service providing server 110 that has the server name "Server B" is capable of providing only the DL service to the communication device.

(Configuration of Service Providing Servers 100, 110)

Each of the service providing servers 100, 110 is a known service providing server for, e.g., "Evernote (Registered Trademark)", "Google (Registered Trademark) Docs", "PICASA (Registered Trademark)", "FACEBOOK (Registered Trademark)", etc. Each of the service providing servers 100, 110 is capable of providing services to various communication devices including the multi-function device 10. As was described with reference to FIG. 4, e.g., the service providing server 100 is capable of providing both the DL service and the UL service to the multi-function device 10, and the service providing server 110 is capable of providing only the DL service to the multi-function device 10.

Moreover, the service providing server 100 is a server provided by a first service provider (i.e., a first company), and the service providing server 110 is a server provided by a second service provider (i.e., a second company) that is different from the first service provider. The first service provider exposes a first API (Application Program Interface) for receiving a service from the service providing server 100, and the second service provider exposes a second API for receiving a service from the service providing server 110.

Since the first service provider and the second service provider are different, the first API and the second API are usually different. In order to receive services from, for example, both the service providing servers 100, 110, communication devices must correspond to both the first and the second API (i.e., require a program for utilizing the first API and a program for utilizing the second API).

For example, in order for the multi-function device 10 to receive services from each of the plurality of service providing servers 100, 110, the multi-function device 10 must correspond to the plurality of APIs, and must store many programs. However, the memory capacity of the memory 34 of the multi-function device 10 is smaller than that of a PC, etc. Consequently, in the present embodiment, the intermediation server 50 is provided so that, without causing many programs to be stored in the multi-function device 10, the multi-function device 10 can receive services from each of the plurality of service providing servers 100, 110. That is, the intermediation server 50 corresponds to a plurality of APIs for the plurality of service providing servers 100, 110. In a situation where the multi-function device 10 is to receive a service from a specific service providing server (e.g., the service providing server 100) from among the plurality of service providing servers 100, 110, the intermediation server 50 executes various communications (to be described; e.g., communication of requests R20, R22, R28, R42, etc. shown in FIG. 7 and FIG. 8) with the specific service providing server by using the API for the specific service providing server. Thereby, even without corresponding to the API for the specific service providing server, the multi-function device 10 can communicate image data with the specific service providing server. That is, the multi-function device 10 can receive services from each of the plurality of service providing servers 100, 110 even without storing many programs for using the plurality of APIs. Further, in a case where specifications of the service providing server are changed, it is possible to correspond to the specification change by changing the programs of the intermediation server 50 even without changing the programs of the multi-function device 10. Further, if the program of the intermediation server 50 is changed so as to correspond to an API for a novel service providing server that is not registered in the server table 68 of the intermediation server 50, the multi-function device 10 can receive a service from the novel service providing server even without changing the programs of the multi-function device 10.

(Advance Preparation by User of Multi-Function Device 10)

In order for the multi-function device 10 to receive a service from the service providing servers 100, 110, the user of the multi-function device 10 (called "specific user" below) must execute the following advance preparation. The specific user accesses the intermediation server 50 by using the PC 90, and selects "acquire authentication information". Moreover, in the present embodiment, the "authentication information" means an access token (to be described: e.g., "XXXXXXXX"). When "acquire authentication information" is selected, the intermediation server 50 sends, to the PC 90, a specific URL for accessing the service providing server 100. The specific URL includes a creating instruction for instructing the service providing server 100 to create the access token, and a sending instruction for instructing the service providing server 100 to send the access token to the intermediation server 50. By using the specific URL, the specific user accesses the service providing server 100 from the PC 90. Next, via the PC 90, the specific user inputs account name and password into the service providing server 100, executing an authentication procedure. When authentication has succeeded, the service providing server 100 creates an access token (e.g., "XXXXXXXX") for the specific user, and sends the access token to the intermediation server 50. Upon receiving the access token for the specific user from the service providing server 100, the intermediation server 50 creates a temporary ID, and sends the temporary ID to the PC 90. Thereby, the temporary ID is displayed in the PC 90. The specific user can learn the temporary ID displayed in the PC 90.

Next, by operating the operation unit 12 of the multi-function device 10, the specific user inputs, into the multi-function device 10, the server name (e.g., "Server A") of the service providing server 100, and the display name (e.g., "Alice"), which is a name for displaying the specific user in the multi-function device 10. By operating the operation unit 12 of the multi-function device 10, the specific user further inputs the temporary ID into the multi-function device 10. In this case, the multi-function device 10 sends the temporary ID to the intermediation server 50. Thereby, the intermediation server 50 sends an access token (e.g., "XXXXXXXX") to the multi-function device 10.

By executing the aforementioned processes, the multi-function device 10 can store information in the display name table 38. In the above example, the multi-function device 10 stores, in the display name table 38, information in which the following are associated: the display name (e.g., "Alice") input by the specific user, the server name (e.g., "Server A") input by the specific user, and the access token (e.g., "XXXXXXXX") received from the intermediation server 50. Thus, the intermediation server 50 temporarily stores the access token without the service providing server 100 and the intermediation server 50 sending the access token to the PC 90. Then the multi-function device 10 acquires the access token from the intermediation server 50 by using the temporary ID. Thereby, it is possible to prevent the access token from being displayed in the PC 90 or being sent from the PC 90 to another device, and consequently exit of high security information, i.e., the access token, can be prevented. Moreover, the specific user can register the server name "Server B" of the service providing server 110, the display name "Alice" and the access token "ZZZZZZZZ" in the display name table 38 for the service providing server 110 as well, in the same manner as above.

(Processes Executed by Devices 10, 50, 100; FIG. 5)

As shown in FIG. 5, a display controlling unit 43 (see FIG. 1) of the multi-function device 10 displays a user information input screen 300 (see FIG. 10) on the display unit 14 by using user information input screen information stored in advance in the multi-function device 10. The user information input screen 300 includes a field for inputting the user name and a field for inputting the password. The specific user operates the operation unit 12 to enter the user name and the password.

Next, the display controlling unit 43 displays a main screen 302 (see FIG. 10) on the display unit 14 by using main screen information stored in advance in the multi-function device 10. The main screen 302 includes a plurality of character strings (e.g., "Internet", "Shortcut", "Copy", etc.) indicating a plurality of functions to be selected by the specific user. In a case where the specific user wishes to receive the DL service or UL service, the specific user selects the character string "Internet" included in the main screen 302. In this case, the display controlling unit 43 supplies a request R2 to the intermediation server 50.

Upon acquiring the request R2 from the multi-function device 10, a screen information supplying unit 72 (see FIG.

1) of the intermediation server 50 supplies, to the multi-function device 10, server name selecting screen information included in the plurality of screen information 66.

Upon acquiring the server name selecting screen information from the intermediation server 50, the display controlling unit 43 of the multi-function device 10 displays, on the display unit 14, a server name selecting screen 306 (see FIG. 10) represented by the server name selecting screen information. The server name selecting screen 306 includes the respective server names (e.g., "Server A", "Server B") of the plurality of service providing servers 100, 110. The specific user operates the operation unit 12 to select, from within the server name selecting screen 306, the server name (called "selected server name" below) of the service providing server from which the multi-function device 10 is to receive a service. In the present embodiment, the description will proceed using the case, as an example, where the specific user selects the server name "Server A" (i.e., the server name of the service providing server 100) included in the server name selecting screen 306. In this case, the display controlling unit 43 supplies the selected server name "Server A" to the intermediation server 50.

Upon acquiring the selected server name "Server A" from the multi-function device 10, a server-side acquiring unit 70 (see FIG. 1) of the intermediation server 50 supplies a request R4 to the multi-function device 10. The request R4 is a request for instructing the multi-function device 10 to supply, to the intermediation server 50, the use information (see FIG. 2) for the specific user who is currently utilizing the multi-function device 10.

Upon acquiring the request R4 from the intermediation server 50, a device-side acquiring unit 41 (see FIG. 1) of the multi-function device 10 acquires specific use information from the use information table 36 within the memory 34 by reading use information (called "specific use information" below) associated with the user name and password that were input into the user information input screen 300. Next, a use information supplying unit 44 (see FIG. 1) supplies the specific use information to the intermediation server 50.

The server-side acquiring unit 70 of the intermediation server 50 acquires the specific use information from the multi-function device 10. In this case, a server-side determining unit 71 (see FIG. 1) executes a determination process of S10. Before describing the contents of the determination process of S10, the relationship will be described between the services (DL service, UL service) that the service providing server 100 is capable of providing, and the functions (print function, scan function) that the multi-function device 10 is capable of executing. In a case of receiving the DL service from the service providing server 100, the multi-function device 10 executes printing according to data downloaded from the service providing server 100. Consequently, in this type of situation, the specific user currently utilizing the multi-function device 10 must be allowed to use the print function. Further, in a case of receiving the UL service from the service providing server 100, the multi-function device 10 uploads, to the service providing server 100, data that was created by scanning a document. Consequently, in this type of situation, the specific user currently utilizing the multi-function device 10 must be allowed to use the scan function. That is, the DL service is a service relating to the print function, and the UL service is a service relating to the scan function.

In the determination process of S10, the server-side determining unit 71 first specifies, from the server table 68 within the memory 64, the available services (i.e., "DL" and "UL") associated with the selected server name "Server A".

Next, by using the specific use information, the server-side determining unit 71 determines whether the specific user is allowed to use only the print function relating to the available service "DL", only the scan function relating to the available service "UL", or both. That is, the server-side determining unit 71 determines NO in the determination process of S10 in a case where "Unlock" is indicated in print use information ("Unlock" or "Lock"), which relates to the print function included in the specific use information, in scan use information ("Unlock" or "Lock"), which relates to the scan function included in the specific use information, or in both the print use information and the scan use information. The server-side determining unit 71 determines YES in the determination process of S10 in a case where "Lock" is indicated in both the print use information and the scan use information.

Moreover, in the above example, the case was described where the selected server name is "Server A". However, in a case, e.g. where the selected server name is "Server B", in the determination process of S10 the server-side determining unit 71 specifies, from the server table 68 within the memory 64, the available service "DL" (see FIG. 4) associated with "Server B". In this case, the server-side determining unit 71 determines NO in the determination process of S10 in the case where the print use information included in the specific use information indicates "Unlock", and determines YES in the determination process of S10 in the case where the print use information indicates "Lock". Further, e.g., in a case where the selected server name is "Server C", in the determination process of S10 the server-side determining unit 71 specifies the available service "UL" associated with "Server C" (see FIG. 4) from the server table 68 within the memory 64. In this case, the server-side determining unit 71 determines NO in the determination process of S10 in the case where the scan use information included in the specific use information indicates "Unlock", and determines YES in the determination process of S10 in the case where the scan use information indicates "Lock".

In the case where YES is determined in the determination process of S10, a screen information supplying unit 72 (see FIG. 1) supplies error screen information included in the plurality of screen information 66 to the multi-function device 10. This error screen information includes a character string indicating that the multi-function device 10 cannot receive any service from the service providing server 100.

Upon acquiring the error screen information from the intermediation server 50, the display controlling unit 43 of the multi-function device 10 displays, on the display unit 14, an error screen 334 (see FIG. 10) represented by the error screen information. Thereby, the specific user can learn that no service can be received from the service providing server 100. Moreover, in this case, the control unit 30 does not execute the processes of FIG. 6 to FIG. 8 (to be described) for receiving a service from the service providing server 100. Thereby, the execution of a function in the multi-function device 10 is prevented. That is, the specific user can be prevented from utilizing a function.

On the other hand, in the case where NO is determined in the determination process of S10, the screen information supplying unit 72 supplies a request R6 to the multi-function device 10. The request R6 is a request for instructing the multi-function device 10 to supply the display name table 38 to the intermediation server 50.

Upon acquiring the request R6 from the intermediation server 50, the display controlling unit 43 of the multi-function device 10 supplies the display name table 38 within the memory 34 to the intermediation server 50.

Upon acquiring the display name table 38 from the multi-function device 10, the screen information supplying unit 72 of the intermediation server 50 specifies, from within the display name table 38, one or more display names (e.g., "Alice", "Ken") associated with the selected server name "Server A". Next, the screen information supplying unit 72 writes the one or more display names that were specified (e.g., "Alice", "Ken") into display name selecting screen information included in the plurality of screen information 66. Next, the screen information supplying unit 72 supplies the display name selecting screen information, into which the one or more display names have been written, to the multi-function device 10.

Upon acquiring the display name selecting screen information from the intermediation server 50, the display controlling unit 43 of the multi-function device 10 displays, on the display unit 14, a display name selecting screen 308 (see FIG. 10) represented by the display name selecting screen information. The display name selecting screen 308 includes one or more display names (e.g., "Alice", "Ken"). The specific user operates the operation unit 12 to select one display name (called "selected display name" below) included in the display name selecting screen 308. In this case, the display controlling unit 43 supplies the selected display name to the intermediation server 50.

Upon acquiring the selected display name from the multi-function device 10, the screen information supplying unit 72 of the intermediation server 50 supplies service name selecting screen information included in the plurality of screen information 66 to the multi-function device 10.

Upon acquiring the service name selecting screen information from the intermediation server 50, the display controlling unit 43 of the multi-function device 10 displays, on the display unit 14, a service name selecting screen 310 (see FIG. 10) represented by the service name selecting screen information. The service name selecting screen 310 includes a service name "DL" indicating the DL service, and a service name "UL" indicating the UL service. As shown in FIG. 6, the specific user operates the operation unit 12 to select one service name (called "selected service name" below) included in the service name selecting screen 310. In this case, a service information supplying unit 45 (see FIG. 1) supplies the selected service name to the intermediation server 50.

Upon acquiring the selected service name ("DL" or "UL") from the multi-function device 10, the server-side acquiring unit 70 of the intermediation server 50 supplies a request R10 to the multi-function device 10. The request R10 is a request for instructing the multi-function device 10 to supply the specific use information to the intermediation server 50.

Upon acquiring the request R10 from the intermediation server 50, the device-side acquiring unit 41 of the multi-function device 10 acquires the specific use information from the use information table 36 within the memory 34. Next, the use information supplying unit 44 supplies the specific use information to the intermediation server 50.

The server-side acquiring unit 70 of the intermediation server 50 acquires the specific use information from the multi-function device 10. In this case, the server-side determining unit 71 executes a determination process of S12. In the determination process of S12, the server-side determining unit 71 determines, by using the specific use information, whether the specific user is allowed to use the function (print function or scan function) relating to the selected service name ("DL" or "UL"). For example, in a situation in which the selected service name is "DL", the server-side determining unit 71 determines NO in the determination process of S12 in a case where the print use information included in the specific use information indicates "Unlock", and determines YES in the determination process of S12 in a case where the print use information included in the specific use information indicates "Lock". Further, e.g., in a situation in which the selected service name is "UL", the server-side determining unit 71 determines NO in the determination process of S12 in a case where the scan use information included in the specific use information indicates "Unlock", and determines YES in the determination process of S12 in a case where the scan use information included in the specific use information indicates "Lock". Thus, by supplying the specific use information and the selected service name to the intermediation server 50, the multi-function device 10 can cause the intermediation server 50 to determine whether the specific user is allowed to use the function (print function or scan function) relating to the service (DL service or UL service) indicated by the selected service name.

In the case where YES is determined in the determination process of S12, the screen information supplying unit 72 supplies the error screen information included in the plurality of screen information 66 to the multi-function device 10. This error screen information includes a character string indicating that the specific user is not allowed to use the function corresponding to the selected service name.

Upon acquiring the error screen information from the intermediation server 50, the display controlling unit 43 of the multi-function device 10 displays, on the display unit 14, an error screen 336 (see FIG. 10) represented by the error screen information. Thereby, the specific user can learn that he is not allowed to use the function corresponding to the selected service name. Moreover, in this case, the control unit 30 does not execute the processes (to be described) for receiving a service from the service providing server 100. Thereby, in the multi-function device 10, the execution of a function corresponding to the selected service name is prevented, and the specific user can be prevented from utilizing the function.

On the other hand, in the case where NO is determined in the determination process of S12, the server-side determining unit 71 further executes a determination process of S14. In a case where the selected service name is "DL" and the remaining pages included in the specific use information indicate zero, the server-side determining unit 71 determines YES in the determination process of S14. In a case where the selected service name is "DL" and the remaining pages included in the specific use information indicate a number other than zero, the server-side determining unit 71 determines NO in the determination process of S14. Further, in a case where the selected service name is "UL", the server-side determining unit 71 determines NO in the determination process of S14.

In the case where YES is determined in the determination process of S14, the screen information supplying unit 72 supplies the error screen information included in the plurality of screen information 66 to the multi-function device 10. Because the number of pages of print medium available to the specific user before printing is zero, this error screen information includes a character string indicating that the specific user is not allowed to use the print function.

Upon acquiring the error screen information from the intermediation server 50, the display controlling unit 43 of the multi-function device 10 displays, on the display unit 14, an error screen (not shown) represented by the error screen information. Thereby, the specific user can learn that the number of pages of print medium available to the specific user before printing is zero. Moreover, in this case, the control unit 30 does not execute the processes of FIG. 7 (to be described) for receiving the DL service from the service providing server 100. Thereby, in the multi-function device 10, the execution of the print function is prevented, and the specific user can be prevented from utilizing the print function.

On the other hand, in the case where NO is determined in the determination process of S14, the server-side determining unit 71 further executes a determination process of S16. In the determination process of S16, the server-side determining unit 71 determines whether the selected service name is "DL". The server-side determining unit 71 determines YES in the determination process of S16 in a case where the selected service name is "DL", and determines NO in the determination process of S16 in a case where the selected service name is "UL".

(Processes for DL Service; FIG. 7)

In the case where YES is determined in the determination process of S16 of FIG. 6 (i.e., in the case where the selected service name is "DL"), as shown in FIG. 7, the screen information supplying unit 72 creates a request R20 according to the first API corresponding to the service providing server 100, and supplies the request R20 to the service providing server 100. The request R20 is a request for instructing the service providing server 100 to supply, to the intermediation server 50, a folder name list indicating one or more folder names storing the image data uploaded by the specific user (i.e., the display name "Alice").

Moreover, as shown in FIG. 5, the intermediation server 50 supplies the request R6 to the multi-function device 10, and acquires the display name table 38 from the multi-function device 10. Consequently, the intermediation server 50 can specify, from the display name table 38, the access token "XXXXXXXX" associated with the selected server name "Server A" and the selected display name "Alice". The intermediation server 50 causes the service providing server 100 to execute authentication, using the access token "XXXXXXXX", at the stage of supplying the request R20 to the service providing server 100, or at an earlier stage. Thereby, the service providing server 100 can supply an appropriate response to the intermediation server 50 in response to the request R20 acquired from the intermediation server 50. Moreover, below, a description of the authentication using the access token is omitted. However, as required (e.g., each time a request is sent to the service providing server 100), the intermediation server 50 may cause the service providing server 100 to execute authentication using the access token.

Upon acquiring the request R20, the service providing server 100 supplies the folder name list to the intermediation server 50.

Upon acquiring the folder name list from the service providing server 100, the screen information supplying unit 72 of the intermediation server 50 writes one or more folder names (e.g., "F1", "F2") included in the folder name list into folder name selecting screen information included in the plurality of screen information 66. Next, the screen information supplying unit 72 supplies, to the multi-function device 10, the folder name selecting screen information into which the one or more folder names have been written.

Upon acquiring the folder name selecting screen information from the intermediation server 50, the display controlling unit 43 of the multi-function device 10 displays, on the display unit 14, a folder name selecting screen 312 (see FIG. 10) represented by the folder name selecting screen information. As described above, until the folder name selecting screen 312 is displayed on the display unit 14, the specific user must execute various selections on the plurality of screens 306, 308, 310 represented by the plurality of screen information acquired from the intermediation server 50. A shortcut function is provided in the multi-function device 10 to reduce this burden on the specific user. By operating the operation unit 12 to select a register button included in the folder name selecting screen 312, the specific user can give the multi-function device 10 a shortcut creation instruction.

Upon being given the shortcut creation instruction from the specific user, the storage controlling unit 46 (see FIG. 1) of the multi-function device 10 stores an association, within the memory 34, of shortcut information for specifying the folder name selecting screen information (i.e., shortcut information for displaying the folder name selecting screen 312 (see reference number 40 of FIG. 1)), and a shortcut name (e.g., "SC1"). The shortcut information here includes the selected server name "Server A", the selected display name (e.g., "Alice"), the selected service name "DL" and the access token (e.g., the access token "XXXXXXXX" associated with "Server A" and "Alice"). Moreover, in a variant, the shortcut information may include, e.g., a URL of the folder name selecting screen information within the intermediation server 50.

Further, the specific user operates the operation unit 12 to select one folder name (called "selected folder name" below) included in the folder name selecting screen 312 (see FIG. 10). In this case, the display controlling unit 43 supplies the selected folder name to the intermediation server 50.

Upon acquiring the selected folder name from the multi-function device 10, the screen information supplying unit 72 of the intermediation server 50 creates a request R22 according to the first API, and supplies the request R22 to the service providing server 100. The request R22 is a request for instructing the service providing server 100 to supply, to the intermediation server 50, URLs of one or more thumbnail image data (called "one or more thumbnail URLs" below) corresponding to the one or more image data stored in the folder having the selected folder name.

Upon acquiring the request R22, the service providing server 100 supplies the one or more thumbnail URLs to the intermediation server 50.

Upon acquiring the one or more thumbnail URLs from the service providing server 100, the screen information supplying unit 72 of the intermediation server 50 supplies, to the multi-function device 10, the one or more thumbnail URLs and thumbnail selecting screen information included in the plurality of screen information 66.

Upon acquiring the one or more thumbnail URLs and the thumbnail selecting screen information from the intermediation server 50, the display controlling unit 43 of the multi-function device 10 supplies a request R24 that includes the one or more thumbnail URLs to the service providing server 100 without going through the intermediation server 50.

Upon acquiring the request R24 from the multi-function device 10, the service providing server 100 supplies the one or more thumbnail image data, which are being stored at the location indicated by the one or more thumbnail URLs included in the request R24, to the multi-function device 10 without going through the intermediation server 50. In the present embodiment, the communication of the thumbnail image data is not executed via the intermediation server 50, and therefore private images of the specific user can be prevented from going through the intermediation server 50.

Upon acquiring the one or more thumbnail image data from the service providing server 100, the display controlling unit 43 of the multi-function device 10 combines the one or more thumbnail image data in the thumbnail selecting screen information. Thereupon, the display controlling unit 43 displays, on the display unit 14, a thumbnail selecting screen 314 (see FIG. 10) represented by the thumbnail selecting screen information in which the one or more thumbnail image data have been combined. The specific user can operate the operation unit 12 to select one thumbnail image data included in the thumbnail selecting screen 314. In this case, the display controlling unit 43 supplies, to the intermediation server 50, a request R26 including one image ID (called "specific image ID" below) for specifying the one thumbnail image data selected by the specific user.

Upon acquiring the request R26 from the multi-function device 10, the screen information supplying unit 72 of the intermediation server 50 creates, according to the first API, a request R28 that includes the specific image ID, and supplies the request R28 to the service providing server 100. The request R28 is a request for instructing the service providing server 100 to supply, to the intermediation server 50, a URL (i.e., a URL of a download source; called "download URL" below) that indicates a location within the service providing server 100 where source image data of the thumbnail image data specified by the specific image ID is being stored.

Upon acquiring the request R28 from the intermediation server 50, the service providing server 100 supplies the download URL to the intermediation server 50.

Upon acquiring the download URL from the service providing server 100, the screen information supplying unit 72 of the intermediation server 50 supplies, to the multi-function device 10, the download URL and "print in progress" screen information included in the plurality of screen information 66.

Upon acquiring the "print in progress" screen information from the intermediation server 50, the display controlling unit 43 of the multi-function device 10 displays, on the display unit 14, a "print in progress" screen 316 (see FIG. 10) represented by the "print in progress" screen information.

Further, upon acquiring the download URL from the intermediation server 50, a requesting unit 42 (see FIG. 1) of the multi-function device 10 supplies a download request R30 that includes the download URL to the service providing server 100 without going through the intermediation server 50. The download request R30 is a request for instructing the service providing server 100 to supply, to the multi-function device 10, image data that is being stored in the location indicated by the download URL. That is, the requesting unit 42 requests the service providing server 100 to provide the DL service.

Upon acquiring the download request R30 from the multi-function device 10, the service providing server 100 supplies image data, which is being stored in the location indicated by the download URL included in the download request R30, to the multi-function device 10 without going through the intermediation server 50. In the present embodiment, the communication of the image data is not performed via the intermediation server 50, and therefore private images of the specific user can be prevented from going through the intermediation server 50.

The requesting unit 42 of the multi-function device 10 acquires the image data from the service providing server 100. Thereby, the multi-function device 10 can receive the DL service from the service providing server 100. Next, the control unit 30 causes the print performing unit 18 to print an image represented by the image data. Thereby, processes related to the DL service end.

(Processes for UL Service; FIG. 8)

On the other hand, in the case where NO was determined in the determination process of S16 of FIG. 6 (i.e., in the case where the selected service name is "UL"), as shown in FIG. 8, the screen information supplying unit 72 supplies scan setting screen information included in the plurality of screen information 66 to the multi-function device 10.

Upon acquiring the scan setting screen information from the intermediation server 50, the display controlling unit 43 of the multi-function device 10 displays, on the display unit 14, a scan setting screen 320 (see FIG. 10) represented by the scan setting screen information. The specific user can give a shortcut creation instruction to the multi-function device 10 by operating the operation unit 12 to select a register button included in the scan setting screen 320.

Upon being given the shortcut creation instruction from the specific user, the storage controlling unit 46 of the multi-function device 10 stores an association, within the memory 34, of shortcut information for specifying the scan setting screen information (i.e., shortcut information for displaying the scan setting screen 320), and a shortcut name (e.g., "SC2"). The shortcut information here, as with the shortcut information stored in FIG. 7, includes "UL" as the selected service name. Moreover, in a variant, the shortcut information may include, e.g., a URL of scan setting screen information within the intermediation server 50.

Further, the specific user operates the operation unit 12 to select, on the scan setting screen 320, various setting items for scanning (scan resolution, file format, size of scan data). The specific user operates the operation unit 12 to select an OK button included in the scan setting screen 320. In this case, the display controlling unit 43 supplies a request R40 to the intermediation server 50.

Upon acquiring the request R40 from the multi-function device 10, the screen information supplying unit 72 of the intermediation server 50 creates a request R42 according to the first API, and supplies the request R42 to the service providing server 100. The request R42 is a request for instructing the service providing server 100 to supply, to the intermediation server 50, a URL (i.e., a URL of an upload destination; called "upload URL" below) that indicates a location within the service providing server 100 where image data created by scanning is to be stored.

Upon acquiring the request R42 from the intermediation server 50, the service providing server 100 supplies the upload URL to the intermediation server 50.

Upon acquiring the upload URL from the service providing server 100, the screen information supplying unit 72 of the intermediation server 50 supplies, to the multi-function device 10, the upload URL and "scan in progress" screen information included in the plurality of screen information 66.

Upon acquiring the "scan in progress" screen information from the intermediation server 50, the display controlling unit 43 of the multi-function device 10 displays, on the display unit 14, a "scan in progress" screen 322 (see FIG. 10) represented by the "scan in progress" screen information. Further, upon acquiring the upload URL from the intermediation server 50, the control unit 30 causes the scan performing unit 20 to scan a document. Next, without going through the intermediation server 50, the requesting unit 42 supplies, to the service providing server 100, an upload request R44 that includes the upload URL acquired from the intermediation server 50 and scan data created by the scan performing unit 20. In the present embodiment, the communication of the scan data is not executed via the intermediation server 50, and therefore private images of the specific user can be prevented from going through the intermediation server 50. Moreover, the upload request R44 is a request for instructing the service providing server 100 to store the scan data at the location indicated by the upload URL. That is, the requesting unit 42 requests the service providing server 100 to provide the UL service.

Upon acquiring the upload request R44 from the multi-function device 10, the service providing server 100 stores the scan data included in the upload request R44 at the location indicated by the upload URL included in the upload request R44. Thereby, processes related to the UL service end.

(Processes in a Case where Shortcut Information is Selected; FIG. 9)

Next, the contents of processes executed by the devices 10, 50, 100 when the specific user selects the shortcut information (see FIG. 7 and FIG. 8) that is being stored in the memory 34 of the multi-function device 10 will be described with reference to FIG. 9.

The processes until the user information input screen 300 and the main screen 302 are displayed are the same as FIG. 5. The specific user operates the operation unit 12 to select the character string "Shortcut" included in the main screen 302. In this case, the display controlling unit 43 displays a shortcut name selecting screen 304 (see FIG. 10) on the display unit 14 by using shortcut name selecting screen information that was pre-stored in the multi-function device 10. The shortcut name selecting screen 304 includes one or more shortcut names (e.g., "SC1", "SC2" etc.) corresponding to one or more shortcut information within the memory 34. The specific user operates the operation unit 12 to select one shortcut name (called "selected shortcut name" below) included in the shortcut name selecting screen 304. That is, by selecting the selected shortcut name, the specific user selects shortcut information (called "selected shortcut information" below) corresponding to the selected shortcut name. In this case, a shortcut information supplying unit 47 (see FIG. 1) reads the selected shortcut information from the memory 34, and supplies the selected shortcut information to the intermediation server 50.

Upon acquiring the selected shortcut information from the multi-function device 10, the server-side acquiring unit 70 of the intermediation server 50 supplies a request R50 to the multi-function device 10. The request R50 is a request for instructing the multi-function device 10 to supply the specific use information to the intermediation server 50.

Upon acquiring the request R50 from the intermediation server 50, the device-side acquiring unit 41 of the multi-function device 10 acquires the specific use information from the use information table 36 within the memory 34. Next, the use information supplying unit 44 supplies the specific use information to the intermediation server 50.

The server-side acquiring unit 70 of the intermediation server 50 acquires the specific use information from the multi-function device 10. In this case, the server-side determining unit 71 executes a determination process of S20. In the determination process of S20, the server-side determining unit 71 determines, by using the specific use information, whether the specific user is allowed to use the function (print function or scan function) relating to the selected service name ("DL" or "UL") included in the shortcut information. The determination process of S20 is the same as the determination process of S12 of FIG. 6. Thus, by supplying the specific use information and the shortcut information to the intermediation server 50, the multi-function device 10 can cause the intermediation server 50 to determine whether the specific user is allowed to use the function relating to the service indicated by the selected service name.

Moreover, after NO was determined in the determination process of S12 of FIG. 6, because the shortcut information is created, NO is usually also determined in the determination process of S20. However, e.g., in a case where the contents of the use information table 36 are changed after the shortcut information has been created (e.g., in a case where the print use information relating to the print function is changed from "Unlock" to "Lock"), YES can be determined in the determination process of S20. In this case, the screen information supplying unit 72 supplies error screen information included in the plurality of screen information 66 to the multi-function device 10. This error screen information includes a character string indicating that the specific user is not allowed to use the function corresponding to the selected service name included in the selected shortcut information. Moreover, this error screen information is the same as the error screen information supplied when YES is determined in the determination process S12 of FIG. 6.

Upon acquiring the error screen information from the intermediation server 50, the display controlling unit 43 of the multi-function device 10 displays an error screen 332 (see FIG. 10) represented by the error screen information on the display unit 14. Moreover, the error screen 332 includes a character string the same as in the error screen 336 (i.e., a character string indicating that the specific user is not allowed to use the function corresponding to the selected service name). Moreover, in this case, the control unit 30 does not execute the processes of FIG. 7 and FIG. 8 for receiving a service from the service providing server 100.

On the other hand, in a case where NO is determined in the determination process of S20, the process proceeds to the determination process of S14 of FIG. 6. The subsequent processes are the same as those in FIG. 6 to FIG. 8. For example, in a case where the selected shortcut information is information that was created in response to operation of the register button included in the folder name selecting screen 312 of FIG. 10, the folder name selecting screen 312 is displayed (see FIG. 7) without the screens 306 to 310 having been displayed. Further, e.g., in a case where the selected shortcut information is information that was created in response to operation of the register button included in the scan setting screen 320 of FIG. 10, the scan setting screen 320 (see FIG. 7) is displayed without the screens 306 to 310 having been displayed. That is, by using the shortcut, the multi-function device 10 can display the folder name selecting screen 312 and the scan setting screen 320 on the display unit 14.

(Effects of the First Embodiment)

The function (print function and scan function) that the multi-function device 10 is capable of executing and the services (DL service and UL service) that the service providing server 100 is capable of providing may seem unrelated at first glance. However, the provision of the DL service can be accompanied by the execution of the print function, and the provision of the UL service can be accompanied by the execution of the scan function. In light of this, the devices 10, 50, 100 execute the processes of FIG. 5 to FIG. 9.

That is, in the situation where the service name "DL" is selected by the specific user, in the case where the specific use information for the specific user indicates that the specific user is allowed to use the print function, the multi-function device 10 displays the folder name selecting screen 312 (see FIG. 10) for receiving the DL service. Thereby, the specific user can execute an operation for receiving the DL service, and consequently the multi-function device 10 can receive the DL service from the service providing server 100. On the other hand, e.g., in the situation where the service name "DL" is selected by the specific user, in the case where the specific use information for the specific user indicates that the specific user is not allowed to use the print function, the multi-function device 10 displays the error screen 336 (see FIG. 10). Thereby, the multi-function device 10 is prevented from receiving the DL service from the service providing server 100. Consequently, in the case where the DL service is selected by the specific user, the multi-function device 10 can display an appropriate screen in accordance with the specific user. In other words, the intermediation server 50 can display an appropriate screen on the multi-function device 10 in accordance with the specific user. According to the present embodiment, the multi-function device 10 can appropriately prevent the multi-function device 10 from receiving the DL service according to the specific use information ("Unlock" or "Lock" of the print function) for the specific user.

For example, in the use information table 36 of FIG. 2, copy function "Lock" is associated with a user name "U1". Consequently, if a user having the user name "U1" selects "Copy" in the main screen 302, at this time the display controlling unit 43 can display an error screen according to the use information table 36. However, use information corresponding to "Internet" is not present in the use information table 36. Consequently, if a user who is prevented from using both the print function and the scan function selects "Internet" in the main screen 302, at this time the display controlling unit 43 cannot display the error screen according to the use information table 36. For example, a multi-function device of a variant example can first learn that an instruction to print or scan has been given, and consequently displays an error screen according to the use information table 36 at the stage when the print operation or scan operation is to be executed (e.g., the stage when a thumbnail is selected in the screen 314, and the stage when the OK button is selected in the screen 320). However, in the multi-function device of the variant example, the user performs selections in the plurality of screens 306 to 314, etc. regardless of the error screen being displayed, and thus the user is made to perform unnecessary operations. By contrast, in the present embodiment, the error screens 334, 336 can be displayed at the timing when the server name was selected in the server name selecting screen 306, or at the timing when the DL service or UL service was selected in the service name selecting screen 310. Consequently, compared to the multi-function device of the variant example, unnecessary operations of the user can be prevented. That is, the user can quickly be notified that he cannot use a function (i.e., the function is not allowed for the user to use (in error)).

Similarly, in the case where the UL service is selected by the specific user, the multi-function device 10 can display an appropriate screen (the scan setting screen 320 or the error screen 336 (see FIG. 10)) in accordance with the specific user. In other words, the intermediation server 50 can display an appropriate screen on the multi-function device 10 in accordance with the specific user. According to the present embodiment, the multi-function device 10 can appropriately prevent the multi-function device 10 from receiving the UL service in accordance with the specific use information ("Unlock" or "Lock" of the scan function) for the specific user.

Further, the multi-function device 10 acquires, from the intermediation server 50, the error screen information representing the error screens 332, 334, 336. Consequently, the error screen information does not need to be stored in advance in the memory 34 of the multi-function device 10. Consequently, the amount of information to be stored in the multi-function device 10 can be reduced. Moreover, in a variant, the error screen information may be stored in advance in the memory 34 of the multi-function device 10. In this case, the display controlling unit 43 may display the error screens 332, 334, 336 by using the error screen information within the memory 34.

Further, the multi-function device 10 supplies the specific use information to the intermediation server 50 in the case of acquiring the request R4 (see FIG. 5), the request R10 (see FIG. 6), or the request R50 (see FIG. 9). According to this configuration, in the case where the determination processes S10, S12, S20 are to be executed, the intermediation server 50 can acquire the specific use information from the multi-function device 10. Consequently, in a situation in which the determination processes S10, S12, S14 do not need to be executed, the intermediation server 50 does not need to manage (i.e., save) the specific use information. Moreover, in a variant, the intermediation server 50 may store the specific use information, which is acquired in response to the request R4 (see FIG. 5), in the memory 64. In this case, in the case where, e.g., the determination process S12 (see FIG. 6) is to be executed, the server-side determining unit 71 may execute the determination process S12 by using the specific use information within the memory 64 without supplying the request R10 (see FIG. 6) to the multi-function device 10.

(Corresponding Relationships)

The intermediation server 50 and the service providing server 100 are respectively examples of the "screen providing server" and the "service providing server". The memory 34 of the multi-function device 10 is an example of the "storage unit". The print function and the scan function are examples of the "plurality of functions". Further, the DL service and the UL service are respectively examples of the "first type of service" and the "second type of service". The selected service name ("DL" or "UL"), the service indicated by the selected service name, and the function ("print function" or "scan function") relating to the service are respectively examples of the "service information", the "specific service" and the "specific function". The folder name selecting screen 312 and the error screen 336 are respectively examples of the "first screen" and the "second screen". Selection of the register button included in the folder name selecting screen 312 is an example of the "shortcut creation instruction".

Second Embodiment

Features differing from the first embodiment will be described. In the first embodiment, the intermediation server 50 executes the determination processes S10 to S14 (see FIG. 5 and FIG. 6). The second embodiment differs from the first embodiment in that the multi-function device 10 executes determination processes S30, S32, as shown in FIG. 11.

The processes until the user information input screen 300 and the main screen 302 are displayed are the same as FIG. 5. When the character string "Internet" included in the main screen 302 is selected, the display controlling unit 43 supplies a request R60 to the intermediation server 50.

Upon acquiring the request R60 from the multi-function device 10, the screen information supplying unit 72 of the intermediation server 50 supplies, to the multi-function device 10, the server name selecting screen information included in the plurality of screen information 66, server relation information, and the error screen information included in the plurality of screen information 66 (i.e., the error screen information representing the error screen 334 (see FIG. 10)). Moreover, the server relation information is information in which, for each of the plurality of servers, the following are associated: the server name of the server, and a function name relating to the available services (see FIG. 4) of the server. That is, in the server relation information, "print", which relates to the DL service, and "scan", which relates to the UL service, are associated with the server name "Server A" (see FIG. 4). Further, in the server relation information, only "print", which relates to the DL service, is associated with the server name "Server B", and only "scan", which relates to the UL service, is associated with the server name "Server C" (see FIG. 4). Moreover, the server relation information may be created according to the server table 68 at the time when the intermediation server 50 acquires the request R60. Further, the server relation information may be stored in advance within the memory 64.

Upon acquiring the server name selecting screen information from the intermediation server 50, the display controlling unit 43 of the multi-function device 10 displays, on the display unit 14, the server name selecting screen 306 (see FIG. 10) represented by the server name selecting screen information. The specific user selects one server name (i.e., the selected server name). In this case, the device-side acquiring unit 41 acquires the specific use information from the use information table 36 within the memory 34. Next, a device-side determining unit 48 (see FIG. 1) executes the determination process of S30 by using the specific use information and the server relation information. For example, a situation is assumed in which the selected server name is "Server B". In this case, the device-side determining unit 48 specifies "print", which is associated with "Server B", from the server relation information. Next, the device-side determining unit 48 determines whether the specific use information is indicating "Unlock" or "Lock" as the print function. The device-side determining unit 48 determines YES in S30 in a case where the specific use information indicates print function "Lock", and determines NO in S30 in a case where the specific use information indicates print function "Unlock".

In the case where YES is determined in the determination process of S30, the display controlling unit 43 displays, on the display unit 14, the error screen 334 (see FIG. 10) represented by the error screen information acquired from the intermediation server 50. Moreover, in this case, the control unit 30 does not execute the processes for receiving a service from the service providing server 100. On the other hand, in the case where NO is determined in the determination process of S30, the display controlling unit 43 supplies the selected server name to the intermediation server 50.

The screen information supplying unit 72 of the intermediation server 50 supplies a request R62 to the multi-function device 10, and acquires the display name table 38 from the multi-function device 10. Next, the screen information supplying unit 72 supplies the display name selecting screen information to the multi-function device 10. Upon acquiring the selected display name from the multi-function device 10, the screen information supplying unit 72 supplies, to the multi-function device 10, the service name selecting screen information included in the plurality of screen information 66, service relation information, and the error screen information included in the plurality of screen information 66 (i.e., the error screen information representing the error screen 336 (see FIG. 10)). Moreover, the service relation information includes information indicating that "DL service" and "print" are related, and information indicating that "UL service" and "scan" are related.

Upon acquiring the service name selecting screen information from the intermediation server 50, the display controlling unit 43 of the multi-function device 10 displays, on the display unit 14, the service name selecting screen 310 (see FIG. 10) represented by the service name selecting screen information. The specific user selects one service name (i.e., the selected service name). In this case, the device-side acquiring unit 41 acquires the specific use information from the use information table 36 within the memory 34. Next, the device-side determining unit 48 executes the determination process of S32 by using the specific use information and the service relation information. For example, a situation is assumed in which the selected service name is "DL". In this case, the device-side determining unit 48 can learn, from the service relation information, that "DL service" and "print" are related. Thereupon, the device-side determining unit 48 determines whether the specific use information is indicating "Unlock" or "Lock" as the print function. The device-side determining unit 48 determines YES in S32 in a case where the specific use information indicates print function "Lock", and determines NO in S32 in a case where the specific use information indicates print function "Unlock". Further, e.g., a situation is assumed in which the selected service name is "UL". In this case, the device-side determining unit 48 can learn, from the service relation information, that "UL service" and "scan" are related. The device-side determining unit 48 determines YES in S32 in a case where the specific use information indicates scan function "Lock", and determines NO in S32 in a case where the specific use information indicates scan function "Unlock".

In the case where YES is determined in the determination process of S32, the display controlling unit 43 displays, on the display unit 14, the error screen 336 (see FIG. 10) represented by the error screen information acquired from the intermediation server 50. Moreover, in this case, the control unit 30 does not execute the processes for receiving a service from the service providing server 100. On the other hand, in the case where NO is determined in the determination process of S32, the display controlling unit 43 supplies the selected service name to the intermediation server 50.

Moreover, in FIG. 11, in the case where NO was determined in the determination process of S32, the selected service name is supplied to the intermediation server 50 without another determination process being executed. However, the device-side determining unit 48 may execute a determination process relating to the remaining pages in the same manner as the determination process of S14 of FIG. 6 of the first embodiment. In this case, in the case where YES is determined in the determination process relating to the remaining pages, the display controlling unit 43 displays an error screen on the display unit 14. In the case where NO is determined in the determination process relating to the remaining pages, the display controlling unit 43 may supply the selected service name to the intermediation server 50.

Upon acquiring the selected server name from the multi-function device 10, the server-side determining unit 71 of the intermediation server 50 executes a determination process of S36 in the same manner as the determination process of S16 of FIG. 6 of the first embodiment. In the case where YES is determined in the determination process of S36, the devices 10, 50, 100 execute the processes for the DL service (see FIG. 7). On the other hand, in the case where NO is determined in the determination process of S36, the devices 10, 50, 100 execute the processes for the UL service (see FIG. 8).

Further, in the first embodiment, in the case where shortcut information is selected by the specific user, the intermediation server 50 executes the determination process S20 of FIG. 9. In the second embodiment, as shown in FIG. 12, the multi-function device 10 differs from the first embodiment in executing a determination process S40.

The processes until the user information input screen 300, the main screen 302, and the shortcut name selecting screen 304 are displayed are the same as FIG. 9. When shortcut information is selected by the specific user, the device-side acquiring unit 41 acquires the specific use information from the use information table 36 within the memory 34. Next, the device-side determining unit 48 executes the determination process of S40 in the same manner as the determination process of S20 of FIG. 9 of the first embodiment.

In a case where YES is determined in the determination process of S40, the display controlling unit 43 displays the error screen 332 (see FIG. 10) on the display unit 14. Moreover, here, the display controlling unit 43 may acquire the error screen information from the intermediation server 50 and display the error screen 332, or may acquire the error screen information stored in advance in the memory 34 of the multi-function device 10, and display the error screen 332. In the case where the error screen 332 is displayed, the control unit 30 does not execute the processes for receiving a service from the service providing server 100. On the other hand, in a case where NO is determined in the determination process of S40, the display controlling unit 43 supplies the selected shortcut information to the intermediation server 50.

The server-side determining unit 71 of the intermediation server 50 executes a determination process of S42, determining whether the selected service name included in the selected shortcut information is "DL". In a case of YES in the determination process of S42 (in a case where the selected service name indicates "DL"), the devices 10, 50, 100 execute the processes for the DL service (see FIG. 7). Thereby, the folder name selecting screen information is supplied from the intermediation server 50 to the multi-function device 10, and the folder name selecting screen 312 is displayed on the multi-function device 10. On the other hand, in a case of NO in the determination process of S42 (in a case where the selected service name indicates "UL"), the devices 10, 50, 100 execute the processes for the UL service (see FIG. 8). Thereby, the scan setting screen information is supplied from the intermediation server 50 to the multi-function device 10, and the scan setting screen 320 is displayed on the multi-function device 10.

(Effects of the Second Embodiment)

In the present embodiment, the multi-function device 10 can appropriately prevent the multi-function device 10 from receiving the DL service and the UL service according to the specific use information ("Unlock", "Lock") for the specific user. Furthermore, in the present embodiment, the multi-function device 10 executes the determination processes of S30, S32, S40, and consequently the multi-function device 10 can rapidly display a screen in accordance with the determination results. Moreover, in the present embodiment, the determination process of S32 of FIG. 11 and the determination process of S40 of FIG. 12 are respectively examples of the "first determination process" and the "second determination process".

Third Embodiment

In the first and the second embodiment, the use information table 36 is stored in the memory 34 of the multi-function device 10. In the third embodiment, the use information table 36 is stored in an administrative server 95 (see FIG. 1), and is not stored in the memory 34. For example, the specific user operates an operation unit of the PC 90 to access the administrative server 95 and store the use information table 36 in the administrative server 95. Moreover, in the present embodiment, the administrative server 95 is connected with the LAN 4. However, the administrative server 95 may be present outside the LAN 4 (i.e., the Internet 6).

For example, in the case of acquiring the request R4 of FIG. 5, the request R10 of FIG. 6, or the request R50 of FIG. 9, the device-side acquiring unit 41 of the multi-function device 10 supplies a request to the administrative server 95, and acquires the specific use information from the use information table 36 within the administrative server 95. In this case, the use information supplying unit 44 supplies, to the intermediation server 50, the specific use information that was acquired from the administrative server 95. Thereby, the server-side acquiring unit 70 of the intermediation server 50 acquires the specific use information from the multi-function device 10. That is, the server-side acquiring unit 70 acquires the specific use information from the administrative server 95 via the multi-function device 10.

Further, in the case where e.g., the determination process of S30 of FIG. 11, the determination process of S32 of FIG. 11, or the determination process of S40 of FIG. 12 is to be executed, the device-side acquiring unit 41 of the multi-function device 10 acquires the specific use information from the use information table 36 within the administrative server 95. Thereupon, the device-side determining unit 48 executes the determination processes S30, S32, S40 by using the specific use information acquired from the administrative server 95.

According to the present embodiment, the use information table 36 does not need to be stored in the memory 34 of the multi-function device 10. Consequently, the amount of information that the multi-function device 10 needs to store can be reduced. Moreover, in the present embodiment, the administrative server 95 is an example of the "specific server", and a memory (not shown) within the administrative server 95 is an example of the "storage unit".

Fourth Embodiment

In the present embodiment, as in the third embodiment, the administrative server 95 is provided. For example, in the case where the determination process of S10 of FIG. 5, the determination process of S12 of FIG. 6, and the determination process of S20 of FIG. 9 are to be executed, the server-side acquiring unit 70 of the intermediation server 50 does not supply the requests R4, R10, R50 to the multi-function device 10. In this case, the server-side acquiring unit 70 supplies a request to the administrative server 95, and acquires the specific use information from the use information table 36 within the administrative server 95. That is, the server-side acquiring unit 70 acquires the specific use information from the administrative server 95 without going through the multi-function device 10. Thereupon, the server-side determining unit 71 executes the determination processes S10, S12, S20 by using the specific use information acquired from the administrative server 95.

In the present embodiment, also, the amount of information that the multi-function device 10 is to store can be reduced. Further, the multi-function device 10 does not need to acquire the specific use information from the administrative server 95 and supply the specific use information to the intermediation server 50. Consequently, the processing load of the multi-function device 10 can be reduced.

(Variant 1)

In the above embodiments, the DL service and the UL service are the example of the "plural types of service". For example, instead of the DL service, the service providing server 100 may provide the following service as a service relating to the print function. That is, the service providing server 100 may provide a service of executing image processing on print object data that is acquired from the PC 90, and supplying the processed data to the multi-function device 10. Further, e.g., instead of the UL service, the service providing server 100 may provide the following service as a service relating to the scan function. That is, the service providing server 100 may provide a service of executing image processing on scan data, and supplying the processed data to the multi-function device 10.

(Variant 2)

In the above embodiments, the use information relating to the print function, and the use information relating to the scan function are registered in the use information table 36. Instead, information ("Unlock", "Lock") relating to the DL function, and information relating to the UL function may be registered in the use information table 36. In the present variant, the determinations may be executed in S10, S12, S30, S32 based on the information relating to the DL function and the information relating to the UL function information included in the specific use information. In the present variant, the DL function and the UL function are an example of the "plurality of functions". Further, the DL service and the UL service are an example of the "plural types of service". Further, in another variant, the following may be registered in the use information table 36: (A1) use information ("Unlock", "Lock") relating to a DL print function in which printing is executed in accordance with data downloaded from the service providing server 100, (A2) use information relating to a DL media function in which the data downloaded from the service providing server 100 is stored within an external memory (e.g., a USB memory) connected with the multi-function device 10, (A3) use information relating to a scan UL function in which scan data is uploaded to the service providing server 100, and (A4) use information relating to a media UL function in which the data within the external memory (e.g., the USB memory) connected with the multi-function device 10 is uploaded to the service providing server 100. In this case, the service providing server 100 may be capable of providing: (B1) a DL print service in which data for printing is supplied to the multi-function device 10, (B2) a DL media service in which data to be stored in the external memory connected with the multi-function device 10 is supplied to the multi-function device 10, (B3) a scan UL service in which scan data supplied from the multi-function device 10 is stored, and (B4) a media UL service in which the data is stored within the external memory connected with the multi-function device 10. According to this configuration, the service name selecting screen 310 (see FIG. 10) may be a screen for selecting one service from among the services (B1) to (B4). In the present variant, the functions (A1) to (A4) are an example of the "plurality of functions". Further, the services (B1) to (B4) are an example of the "plural types of service".

(Variant 3)

In the above embodiments, information indicating whether each function is "Unlock" or "Lock" is registered in the use information table 36 as the use information for each user. Instead, only the "Unlock" function, or only the "Lock" function may be registered in the use information table 36 as the use information for each user. That is, in general terms, the use information may include any information relating to whether the user is allowed to use the functions.

(Variant 4)

There is no particular restriction on the character strings included in the error screens 332, 336. For example, the error screens 332, 336 may simply include only a character string "Error". In the present variant, also, the specific user can learn that he is not capable of receiving the service corresponding to the selected service name from the service providing server 100. In general terms, the "second screen" may include only the character string "Error", or may include a character string for describing the contents of the error.

(Variant 5)

In the above embodiments, in the case where the service name "DL" included in the service name selecting screen 310 is selected, the display controlling unit 43 displays the folder name selecting screen 312. Instead, in the case where the service name "DL" included in the service name selecting screen 310 is selected, the display controlling unit 43 may, without displaying the folder name selecting screen 312, display a thumbnail selecting screen that includes a plurality of thumbnail image data corresponding to the plurality of image data uploaded by the specific user. In the present variant, the thumbnail selecting screen is an example of the "first screen". Further, the case where the service name "DL" included in the service name selecting screen 310 is selected, the display controlling unit 43 may display a print condition setting screen for setting a print condition (print resolution, paper size, etc.) before displaying the folder name selecting screen 312. In the present variant, the print condition setting screen is an example of the "first screen". In general terms, the "first screen" may be any screen for receiving the specific service from the service providing server.

(Variant 6)

In the case where the shortcut creation instruction is given (e.g., in the case where the register button is selected in the folder name selecting screen 312 (see FIG. 10)), the storage controlling unit 46 may instruct the intermediation server 50 to create the shortcut information. Thereupon, the storage controlling unit 46 may acquire the shortcut information from the intermediation server 50 and store the shortcut information in the memory 34.

(Variant 7)

The intermediation server 50 may be configured by two or more servers. For example, the intermediation server 50 may be configured by a server for supplying screen information to the multi-function device 10, and a server for executing an API for receiving the DL service and the UL service.

(Variant 8)

In the first embodiment, the display controlling unit 43 acquires the error screen information, the folder name selecting screen information, or the scan setting screen information from the intermediation server 50 after the determination process of S12 of FIG. 6. Instead, the display controlling unit 43 may acquire the screen information from the intermediation server 50 before the determination process of S12. In this case, the display controlling unit 43 may acquire the results of the determination processes of S12 to S16 from the intermediation server 50, and may display a screen represented by the acquired screen information in accordance with the results. In general terms, the display controlling unit may acquire the first screen information (or second screen information) from the screen providing server before the "screen providing server determines that the specific function is allowed to be used by (or is not allowed to be used by) the specific user" or may acquire the first screen information (or second screen information) from the screen providing server after the aforementioned determination. Similarly, in the second embodiment as well, the display controlling unit 43 may acquire the folder name selecting screen information, etc. from the intermediation server 50 before the determination process of S32 of FIG. 11. In general terms, the display controlling unit may acquire the first screen information (or second screen information) from the screen providing server before the first determination process, or may acquire the first screen information (or second screen information) from the screen providing server after the first determination process.

(Variant 9)

In the second embodiment, as shown in FIG. 11, the device-side determining unit 48 executes the determination process of S30 by using the server relation information acquired from the intermediation server 50. Instead, the server relation information may be stored in advance in the memory 34 of the multi-function device 10. In this case, the device-side determining unit 48 may execute the determination process of S30 by using the server relation information within the memory 34. In another variant, the device-side determining unit 48 may acquire the server table 68 from the intermediation server 50 and execute the determination process of S30 by using the server table 68 in the same manner as S10 of FIG. 5.

(Variant 10)

In the second embodiment, as shown in FIG. 11, the device-side determining unit 48 executes the determination process of S32 by using the service relation information acquired from the intermediation server 50. Instead, the service relation information may be stored in advance in the memory 34 of the multi-function device 10. In this case, the device-side determining unit 48 may execute the determination process of S32 by using the service relation information within the memory 34.

(Variant 11)

The storage controlling unit 46 may store the shortcut information 40 in a memory of an external device (e.g., the administrative server 95, the intermediation server 50, etc.) without storing the shortcut information 40 in the memory 34 of the multi-function device 10. In this case, as necessary, the shortcut information supplying unit 47 may acquire the shortcut information 40 from the external device and supply the shortcut information 40 to the intermediation server 50. That is, the "memory" may be a memory of the multi-function device 10, or a memory of the external device. Further, the display name table 38 may be stored in the memory of the external device without being stored in the memory 34 of the multi-function device 10. In this case, as necessary, the display controlling unit 43 may acquire the display name table 38 from the external device and supply the display name table 38 to the intermediation server 50.

(Variant 12)

In the above embodiments, the functions of the units 41 to 48, 70 to 72 are realized by the CPUs 32, 62 of the multi-function device 10 and the intermediation server 50 executing processes according to software. Instead, at least a part of the functions of the units 41 to 48, 70 to 72 may be realized by hardware such as a logic circuit, etc.

What is claimed is:

1. A multi-function device configured to execute a plurality of functions related to plural types of services that one or more service providing servers are capable of providing, the multi-function device comprising:
    a processor; and
    a memory configured to store computer-readable instructions therein, the computer-readable instructions, when executed by the processor, causing the multi-function device to perform:
    acquiring, from a storage storing a plurality of use information corresponding to a plurality of users, specific use information corresponding to a specific user who uses the multi-function device, each of the plurality of use information including information related to whether or not a user corresponding to the use information is allowed to use each function that the multi-function device is capable of executing;
    causing a display of the multi-function device to display a server selection screen for selecting a specific service providing server from among the one or more service providing servers;
    in a case where the specific service providing server is selected in the server selection screen by the specific user:
        specifying whether or not the specific service providing server is capable of providing only one service related to one function that is determined based at least on server relation information indicating which service each of the one or more service providing servers is capable of providing;
        determining, by using the specific use information and without a service being selected by the specific user, whether or not the specific user is allowed to use the one function, in a case where it is specified that the specific service providing server is capable of providing the only one service related to the one function;
        causing the display to display an error screen indicating that it is not capable of receiving a service from a service providing server, in a case where it is determined that the specific user is not allowed to use the one function; and
        causing the display to display a next screen for receiving a service from a service providing server, in a case where it is determined that the specific user is allowed to use the one function;
    in a case where a specific service among the plural types of services is selected by the specific user:
        specifying a specific function related to the specific service, the specific function being determined based at least on service relation information indicating which function each of the plural types of services is related to;
        determining, by using the specific use information, whether or not the specific user is allowed to use the specified specific function;
        causing the display to display a first screen, in a case where it is determined that the specific user is allowed to use the specific function, the first screen being for receiving the specific service from a specific service providing server among the one or more service providing servers, the first screen being a setting screen for the specific service; and causing the display to display a second screen indicating that it is not capable of receiving a service from a service providing server, in a case where it is determined that the specific user is not allowed to use the specific function, the second screen being displayed without the first screen being displayed; and in a case where a particular function is selected by the specific user:

determining by using the specific use information, without specifying a function, whether or not the specific user is allowed to use the selected particular function;

executing the selected particular function in a case where it is determined that the specific user is allowed to use the selected particular function; and causing the display to display an error screen indicating that it is not capable of executing the selected particular function, in a case where it is determined that the specific user is not allowed to use the selected particular function.

2. The multi-function device as in claim 1, wherein the computer-readable instructions, when executed by the processor, cause the multi-function device to further perform acquiring screen information from a screen providing server, wherein the first screen is displayed by using first screen information acquired from the screen providing server, wherein the screen providing server is configured separate from the one or more service providing servers, and wherein the screen providing server is a server for intermediating a service provision from each of the one or more service providing servers to the multi-function device.

3. The multi-function device as in claim 1, wherein the plurality of functions includes a print function for executing printing of an image represented by image data and a scan function for creating scan data by scanning a document, and wherein the plural types of services includes:

a first type of service for supplying the image data to the multi-function device, and a second type of service for storing the scan data.

4. The multi-function device as in claim 1, wherein the storage is provided within the multi-function device, and wherein the specific use information is acquired from the storage within the multi-function device.

5. The multi-function device as in claim 1, wherein the storage is provided within a specific server configured separate from the multi-function device, and wherein the specific use information is acquired from the storage within the specific server.

6. The multi-function device as in claim 1, wherein the computer-readable instructions, when executed by the processor, cause the multi-function device to further perform acquiring screen information from a screen providing server, wherein the first screen is displayed by using first screen information acquired from the screen providing server, wherein the acquiring of the screen information includes acquiring, from the screen providing server, service selection screen information representing a service selection screen and second screen information representing the second screen, wherein the computer-readable instructions, when executed by the processor, cause the multi-function device to further perform:

causing the display to display the service selection screen represented by the service selection screen information after acquiring the service selection screen information and the second screen information, the service selection screen being for selecting the specific service from among the plural types of services; and requiring the screen providing server to provide the first screen information to the multi-function device, in the case where it is determined that the specific user is allowed to use the specific function, and wherein the second screen is displayed by using the acquired second screen information, in the case where it is determined that the specific user is not allowed to use the specific function.

7. The multi-function device as in claim 1, wherein the service relation information is stored within a specific server configured separate from the multi-function device and the one or more service providing servers.

* * * * *